United States Patent

Ishikawa et al.

[11] Patent Number: 5,838,833
[45] Date of Patent: Nov. 17, 1998

[54] FRACTAL IMAGE COMPRESSION METHOD AND DEVICE AND FRACTAL IMAGE RESTORATION METHOD AND DEVICE

[75] Inventors: Atsushi Ishikawa; Tetsuya Itoh, both of Okazaki, Japan

[73] Assignee: Minolta Co., Ltd., Osaka, Japan

[21] Appl. No.: 659,246

[22] Filed: Jun. 7, 1996

[30]   Foreign Application Priority Data

| Jun. 30, 1995 | [JP] | Japan | 7-165670 |
| Jul. 7, 1995 | [JP] | Japan | 7-172000 |
| Jul. 21, 1995 | [JP] | Japan | 7-185196 |
| Aug. 9, 1995 | [JP] | Japan | 7-202940 |
| Aug. 25, 1995 | [JP] | Japan | 7-217094 |

[51] Int. Cl.$^6$ .................. G06K 9/36; G06K 9/46
[52] U.S. Cl. .......................... 382/249; 382/232
[58] Field of Search .................. 382/249, 176, 382/239, 240

[56]         References Cited

U.S. PATENT DOCUMENTS

| 4,941,193 | 7/1990 | Barnsley et al. | 382/249 |
| 5,065,447 | 11/1991 | Barnsley et al. | 382/249 |
| 5,553,160 | 9/1996 | Dawson | 382/166 |

FOREIGN PATENT DOCUMENTS

| 5-130432 | 5/1993 | Japan . |
| 6-98310 | 4/1994 | Japan . |

OTHER PUBLICATIONS

Arnaud E. Jacquin, Image Coding Based on a Fractal Theory of Iterated Contractive Image Transformation, IEEE Transactions on Image Processing, vol. 1, No. 1, Jan. 1992, pp. 18–30.

*Primary Examiner*—Jose L. Couso
*Assistant Examiner*—Dimitry A. Novik
*Attorney, Agent, or Firm*—Burns, Doane, Swecker & Mathis, LLP

[57]               ABSTRACT

Image compression is accomplished by dividing an image into blocks which are encoded and compressed by finding similarities among the blocks. Image quality and speed are increased through several mechanisms such as varying the size of the blocks when image edges or test is present, by comparing the image blocks to prestored image patterns rather than other portions of the image, using raw data rather than compressed data under certain conditions and the use of inspection areas to increase the possibility of finding the most similar area quickly.

11 Claims, 32 Drawing Sheets

Density pattern

BAD1

BAD2

BAD3

BAD4

1

FRACTAL IMAGE COMPRESSION METHOD AND DEVICE AND FRACTAL IMAGE RESTORATION METHOD AND DEVICE

BACKGROUND OF THE INVENTION

1. Field of the Invention

The present invention relates to a fractal image compression method and device for compressing images based on a fractal theory. The present invention further relates to a fractal image compressed data restoration method and device for restoring compressed multilevel images based on the fractal theory.

2. Description of the Related Art

Image compression technology is a key technology in the realization of multimedia computer programs. The Joint Photographic Experts Group (JPEG) is accociated with current image compression technology. However, the fractal image compression prepered by Dr. Barnsley of Iterated Systems, Inc., is among the compression technologies that have earned particular interest recently. Fractal image compression is a method which uses partial similarities within a natural image. That is, when a part of a particular original image is extracted, another image similar to the extracted image may be considered as existing at a different size and location within the original image. An original image is divided into a plurality of blocks and encoded and compressed by similarities among the blocks using partial similarities, and conversely an image compressed by such means can be restored so as to reproduce the original image. U.S. Pat. Nos. 4,941,193 and 5,065,447 disclose these and other aspects of the fractal image compression.

Fractal image compression is advantageous inasmuch as image restoration is not dependent on resolution because of this method's use of partial similarities among blocks of different sizes within the image, unlike other compression methods. Thus, the fractal image compression method is advantageous in that image quality does not deteriorate when an image is output to a device having a different resolution, unlike other compression methods, and is particularly desirable in the era of multimedia applications.

FIG. 32 succinctly shows conventional fractal image compression.

In FIG. 32, original image GF is divided into a plurality of range blocks BR (block size: K×L), and a plurality of domain blocks BD larger in size than the range blocks BR (block size: M×N; M>K, N>L). A reduced pattern BDP1 is created in a size identical to range block BR by reduction conversion of each domain block BD. A total of eight types of reduced patterns BDP1~8 for each domain block BD are obtained by subjecting the reduced pattern BDP1 to rotation conversions of 0°, 90°, 180°, and 270°, and performing density inversion conversions on the obtained reduced patterns BDP1~4.

Relative to one range block BR, each reduced pattern BDP1~8 of all domain blocks BD are compared to calculate error, and the reduced pattern BDP of the domain block BD having the smallest error is selected. Information relating to the position of the selected domain block BD within the original image GF and information relating to the reduced pattern BDP conversion parameters are output as code data of the range block BR. In order to create the initial image during restoration, an average value of the density of each range block BR is calculated beforehand and included in the code data. Compressed code data for the original image GF are obtained by subjecting all range blocks BR to the aforesaid process.

When restoring the aforesaid code data, an optional initial image at the position of a domain block included in the code data is converted in accordance with the conversion parameters contained in the code data so as to produce an image of a decoded range block BD BR nearer to the original image than the initial image. Thus, a restored image near the original image can be produced by repeating the aforesaid process many times for the entire image.

An example of the literature relating to the aforesaid type of fractal image compression is Japanese Unexamined Patent Application No. HEI 6-98310.

In conventional fractal image compression, compression is accomplished by undiscriminated and identical processing of both text areas and photographic areas of an original image GF. Therefore, special processing cannot be implemented to prevent image quality defects by area, which is particularly disadvantageous when image quality defects arise during image restoration.

Also, although it is desirable to make the range blocks BR small in size during fractal image compression to improve the quality of the restored image, the reduction ratio cannot be improved due to the increase in the amount of data produced just by making the range block size smaller. Therefore, some quality defects are unavoidable when obtaining a certain degree of compression in the conventional fractal image compression.

Furthermore, during expansion of compressed fractal image data, the unexpressed portions of the initial restored image cannot be adequately reproduced near enough to the original image GF. For example, when expanding compressed fractal image data, the initial image is obtained by the average values of the range blocks of the original image GF, but this does not allow for the expression of edge areas in the initial image. Accordingly, the range blocks containing edge areas of text images in the original image GF, cannot completely reproduce the edge areas during the expansion process. Therefore, when text images are contained in an original image GF and the image is expanded after having been compressed, there is a problem of image quality deterioration.

Another disadvantage in conventional fractal image compression is that a large amount of time is required for the compression process because the domain blocks BD are sequentially allocated from the entire original image GF, and the domain block BD having the smallest error is searched from among all the domain blocks BD.

Yet another disadvantage during image restoration is that much time is required for the restoration process since the restoration process is repeated several times based on the code data to obtain a restored image of each range block BR, and naturally many repetitions are necessary to restore an image which is faithful to the original image.

SUMMARY OF THE INVENTION

An object of the present invention is to eliminate the previously described disadvantages of conventional fractal image compression by providing a fractal image compression device having a high compression ratio without image quality deterioration by varying the size of range blocks during compression in accordance with area discrimination.

A further object of the present invention is to provide a fractal image restoration device for restoring compression data of fractal images with minimum image quality deterioration by application of suitable processes in accordance with area discrimination results of the range blocks during image restoration.

In the fractal image compression device of the present invention, an area discriminating means accomplishes area discrimination of range blocks. Area discrimination involved the discrimination of text areas and photographic areas. In order to discriminate whether or not an area is a text area, a decision must be made, for example, as to whether or not an area is an edge area containing an edge. A reallocation means reallocates range blocks in accordance with area discrimination results. Thus, the size of range blocks become smaller after reallocation (reallocated range blocks), and image quality deterioration in the restored image is prevented because there are fewer range blocks containing edges.

In the fractal image restoration device of the present invention, the restored image is written to an image memory. At the beginning of restoration, an initial image is created based on, for example, the average density value of range blocks contained in the code data, and the image is written to an image memory. A conversion means retrieves from the image memory the image data of a domain block corresponding to the range block based on the position information of the domain block contained in the code data, and executes a conversion process based on the conversion parameters contained in the code data. This conversion process is identical to the conversion process performed on the domain block during compression, e.g., reduction conversion, rotation conversion, density inversion conversion, mirror inversion conversion and the like.

The area discriminating means discriminates areas of a range block based on information relating to the size of the range block. Information relating to range block size may use, for example, the reduction ratio contained in the conversion parameters. That is, because during compression, the occurrence of reallocation is determined in accordance with the area discrimination results of a range block and the determination is used in determining a reduction ratio, this reduction ratio is information expressing the size of the range block as well as the results of area discrimination. For example, area discrimination is performed on a range block to discriminate whether or not the area is a text area (edge area) or a photographic area, and, when the area is a text area, the range block is divided into quarters and the reduction ratio of a text area is ¼ that of photographic areas.

A first process means performs, for example, an edge reproducing process on image data subjected to conversion processing by the conversion means, and a second process means performs, for example, a smoothing process on image data subjected to conversion processing by the conversion means. The image data selecting means selects the output of either the first process means or second process means in accordance with the area discrimination results, and writes the image data to the image memory. For example, text reproducibility is excellent when image data are selected which have been subjected to an edge process after being discriminated as a text area by the area discriminating means, and photographic reproducibility is excellent when image data are selected which have been subjected to a smoothing process after being discriminated as a photographic area by the area discriminating means, thereby improving image quality in both instances.

In the selection of output of the first process means and output of the second process means, the first process means and the second process means both may be operated beforehand so as to make a selection by switching the image data output therefrom, and either the first process means or second process means may perform processing alone beforehand so as to make a selection by switching the process content. The conversion means, area discriminating means and like means may be implemented by circuits using hardware, or implemented by software using MPU and the like.

Another object of the present invention is to provide a fractal image compression device capable of reducing the time required for image compression processing, and which prevents image quality deterioration of images containing, for example, text image areas.

Density pattern data are recorded as domain blocks in the density pattern recording means by the same process as the domain blocks allocated from the original image. For example, density pattern data may be blocks of identical size to the domain blocks allocated from the original image, and various patterns may be prepared from black and white binary images. In this case, density pattern data closely expresses text image edge areas, such that the error is very small relative to range blocks containing edge areas, and such error may approach zero at times.

Domain blocks read out from the density pattern memory, i.e., density pattern data, are subjected to reduction conversion by an identical process to that of the domain blocks allocated from the original image, and used to create reduced patterns the same size as the range blocks. This reduced pattern is subjected to affine transformations such as rotation conversion, density inversion conversion and the like to obtain a plurality of reduced patterns. The various reduced patterns of all density pattern data of a single range block are compared, error calculated, and the density pattern data and its reduced patterns having the smallest error are selected. When the error of the selected density pattern data is less than a threshold value, code data are created based on the selected density pattern data.

When the error of the selected density pattern data is not less than a threshold value, domain blocks are sequentially allocated from the original image, and the allocated domain blocks are subjected to processes such as reduction conversion, rotation conversion, density inversion conversion, error calculation and the like. Then, the domain block and reduced pattern having the smallest error are used to create code data. The control means controls the aforesaid operations.

In view of the previously described disadvantages, yet another object of the present invention is to provide a fractal image compression method and device capable of reducing the time required for image restoration processing by reducing the number of repetitions of the restoration process for image restoration.

The raw image data and average value of a range block are selected by a selecting means. A control means executes controls so as to select image data of an object range block and generate code data when a range block satisfies constant conditions during image compression.

When the aforesaid constant conditions are satisfied, e.g., when the reduced pattern error of the most similar block (a domain block with the smallest error) of the range block is greater than a previously set threshold value, the original image is used rather than compressed data.

In view of the previously described disadvantages, yet a further object of the present invention is to provide a fractal image compression device capable of reducing the time required for image compression processing by starting an inspection from an area having the highest possibility of being the most similar block.

The original image is divided into a plurality of inspection areas by an inspection area allocating means. Each allocated inspection area is ranked by the ranking means. At this time, the inspection area having the highest possibility of being the most similar block is assigned the highest rank.

A control means inspects during image compression the domain blocks sequentially from the highest to the lowest ranking inspection area. When the error in a domain block allocated within a selected inspection area is less than a threshold value, the domain block having the smallest error therein is selected, and code data are generated. The domain block with the smallest error among all domain blocks is selected, and used to generate code data. The controls means controls this operation.

The various means such as the inspection area allocating means, ranking means, domain block allocating means, domain block selecting means, control means and the like may be implemented by circuits using hardware, or implemented by software using a MPU and the like.

In the present invention, affine transformation includes various conversions including reduction conversion, rotation conversion, density inversion conversion, mirror conversion, translation conversion and the like.

DESCRIPTION OF THE PREFERRED EMBODIMENTS

For clarity of description, different aspects of the invention will be discussed separately. However, it will be understood that any two or more of these aspects can be operatively combined in a specific embodiment.

First Aspect of the Invention

The fractal image compression device of the present invention is described hereinafter.

Figure 1:
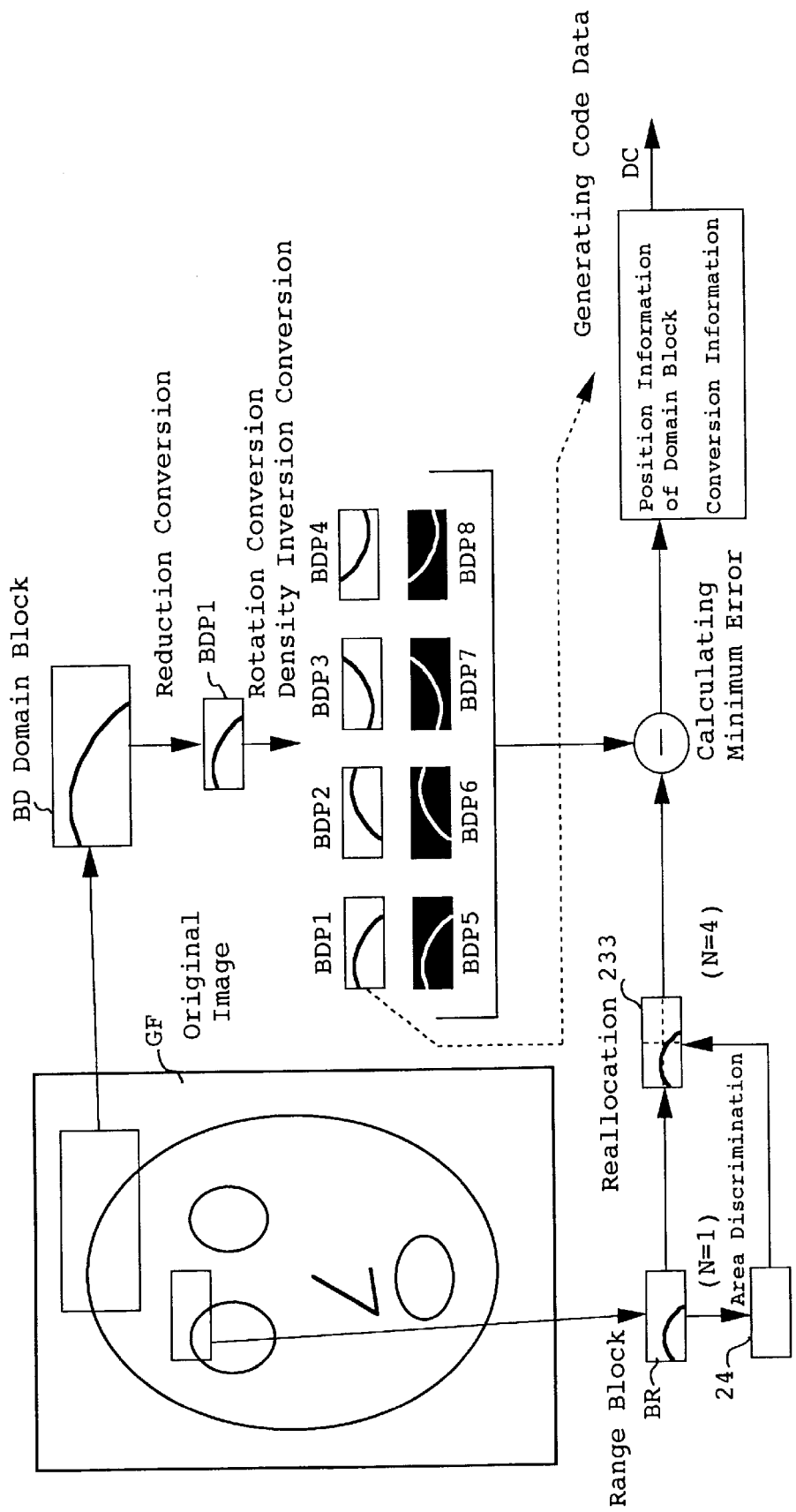
FIG. 1 shows the fractal image compression device in accordance with a first aspect of the present invention.
Figure 2:
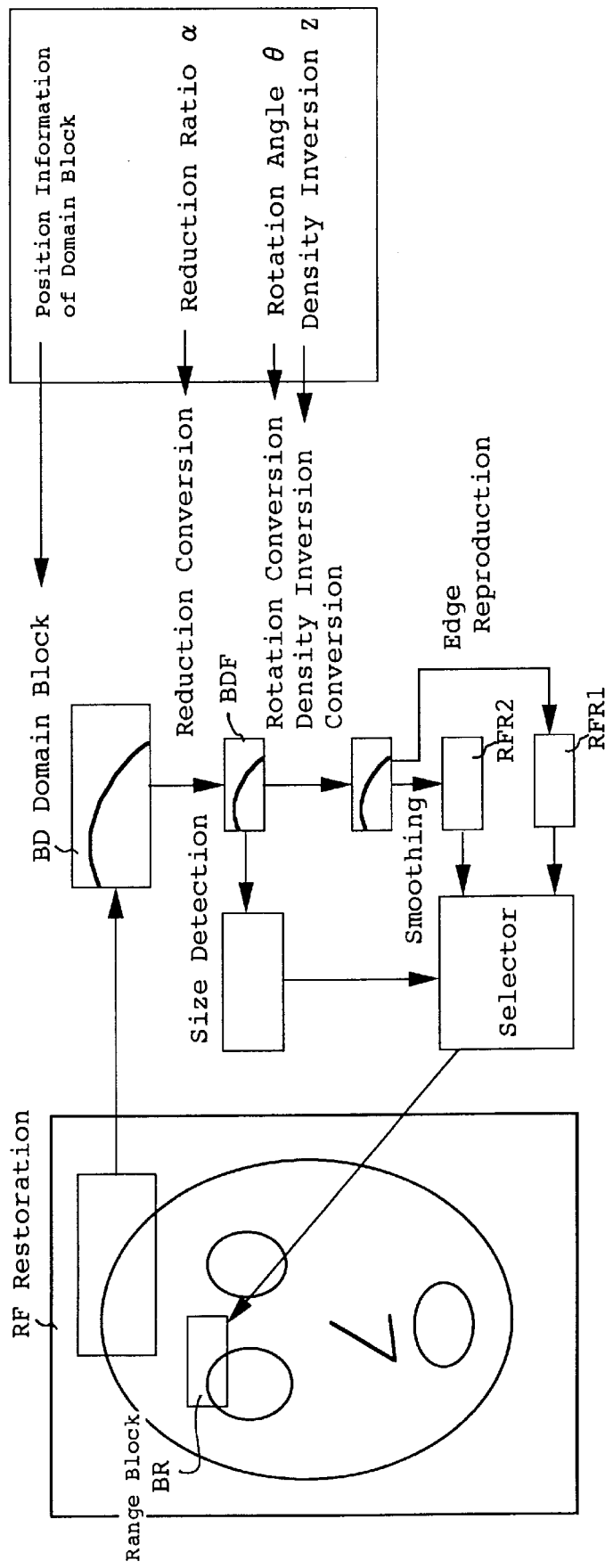
FIG. 2 shows the image restoration of a compressed fractal image in accordance with the present invention.
Figure 8:
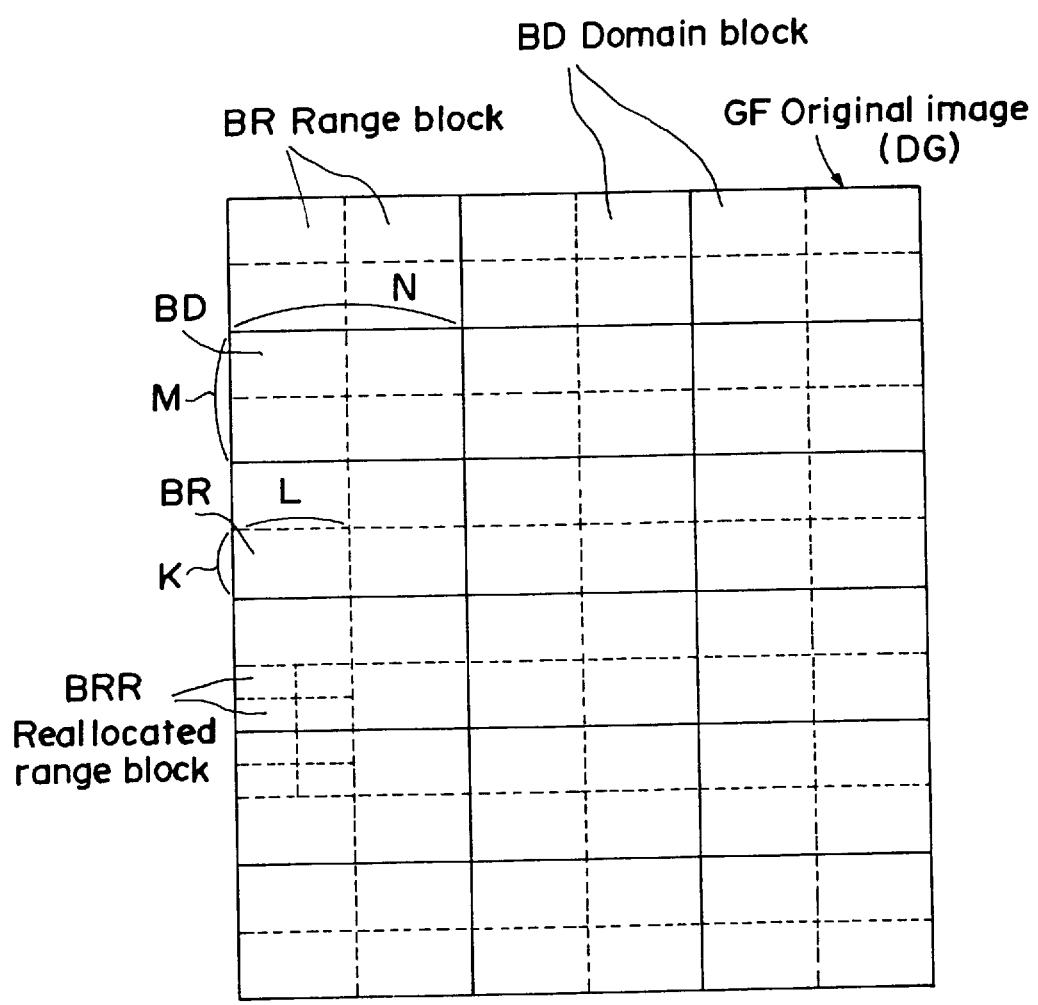
FIG. 8 shows the relationship between the domain block and the range block in an original image in accordance with the present invention.
Figure 32:
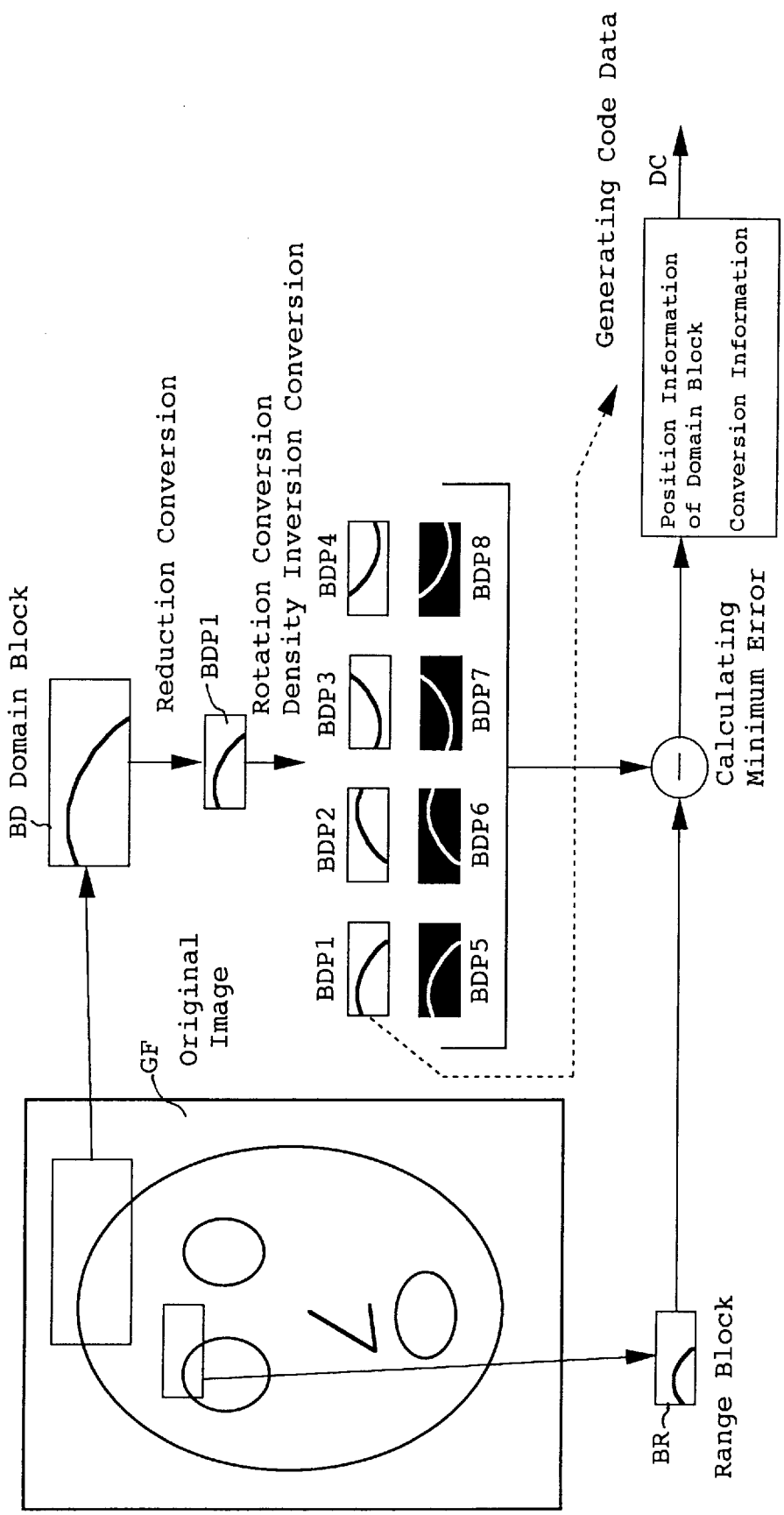
FIG. 32 shows conventional fractal image compression.

FIG. 1 shows a fractal image compression device in accordance with a first aspect of he present invention. FIG. 2 shows a fractal image restoration device for restoring compressed fractal image data. FIG. 8 is an illustration showing the relationship between range blocks BR and domain blocks BD in original image GF. In FIG. 1, items identical to those of the conventional technology described in FIG. 32 are omitted in the following discussion.

In FIG. 1, original image GF is divided into a plurality of range blocks BR (block size: K×L), and area discrimination is accomplished using the allocated range blocks BR. When a range block is identified as an edge area by area discrimination 24, the range block BR is reallocated. That is, an edge area is discriminated when the difference (Cmax−Cmin) between the maximum density value Cmax and minimum density value Cmin of pixels contained in the range block BR exceeds a constant reference value A. The constant reference value A is empirically determined to be an indicator differentiating between text and photographic area. By discriminating whether or not an area is an edge area, it can be determined whether or not the area is a text area or a photographic area.

When an area is an edge area, the minimum error is calculated for these range blocks BR (hereinafter referred to as reallocated range block BRR) obtained by reallocating the range block BR. When an area is not an edge area, the minimum error is calculated for the range block BR without the range block BR undergoing any reallocation. The average density value VM is calculated for the range blocks BR (range block BR or reallocated range block BRR). A code table DC is created based on the calculated average density value VM and position information of the minimum error domain block BD, conversion information (conversion parameters) of reduction ratio (reduction conversion coefficient) α and rotation angle (rotation conversion coefficient) for the reduced patterns BDP1~8, and information Z expressing the presence/absence of density conversion. Range block BR is often a normal square, e.g., 8×8 pixels, 4×4 pixels or the like. Domain block BD often has a shape similar to range block BR, albeit larger in size.

In FIG. 2, restored image RF is a restored (expanded) image approaching the original image GF in accordance with repeated restoration processing, and an initial image is created at the start of the restoration process. An initial image is set, for example, by the average density value VM of each range block BR contained in code data DC. In the restoration process, domain block BD is extracted from the restored image RF based on the position information of domain block BD contained in the initial code data DC. Then, the reduction ratio α contained in code data DC is used to accomplish the reduction conversion of the extracted domain block BD and obtain the reduction conversion image BDF. The reduction conversion image BDF is subjected to rotation conversion using rotation angle θ, and converted in accordance with the information Z indicating density inversion conversion to obtain rotation conversion image BDG. The rotation conversion image BDG is subjected to an edge reproduction process and smoothing process to obtain the range restored images RFR1 and RFR2 which are the restored images of the range blocks BR.

When, for example, the density of a single pixel is different from the densities of surrounding pixels, the edge process matches the density of the single pixel to the densities of surrounding pixels by setting the density of each pixel as a binary density via a threshold. Thus, the edge portions of text can be reproduced and emphasized. The smoothing process sets the density value of each pixel so as to produce a smooth change in density, for example, between adjacent pixels.

The size of range block BR is detected by the reduction ratio a, and the range restored image RFR1 obtained from the edge reproduction process is selected when the range block BR is the edge area of a reallocated range block BRR, and range restored image RFR2 obtained from the smoothing process is selected when the range block BR is a non-edge area, and the restored image RF of the target range block BR is refreshed by either the selected range restored image RFR1 or RFR2. All range blocks BR, i.e., code data for all areas, have the restored image RF refreshed once by a single implementation of the aforesaid process. A restored image RF is obtained which is near the original image GF by repeating the aforesaid process a number of times. Thus, image compression and restoration are accomplished by the repetitive conversion encoding method.

The construction and operation of the image compression device 1 and image expansion device 2 of the present invention are described hereinafter.

Figure 3:
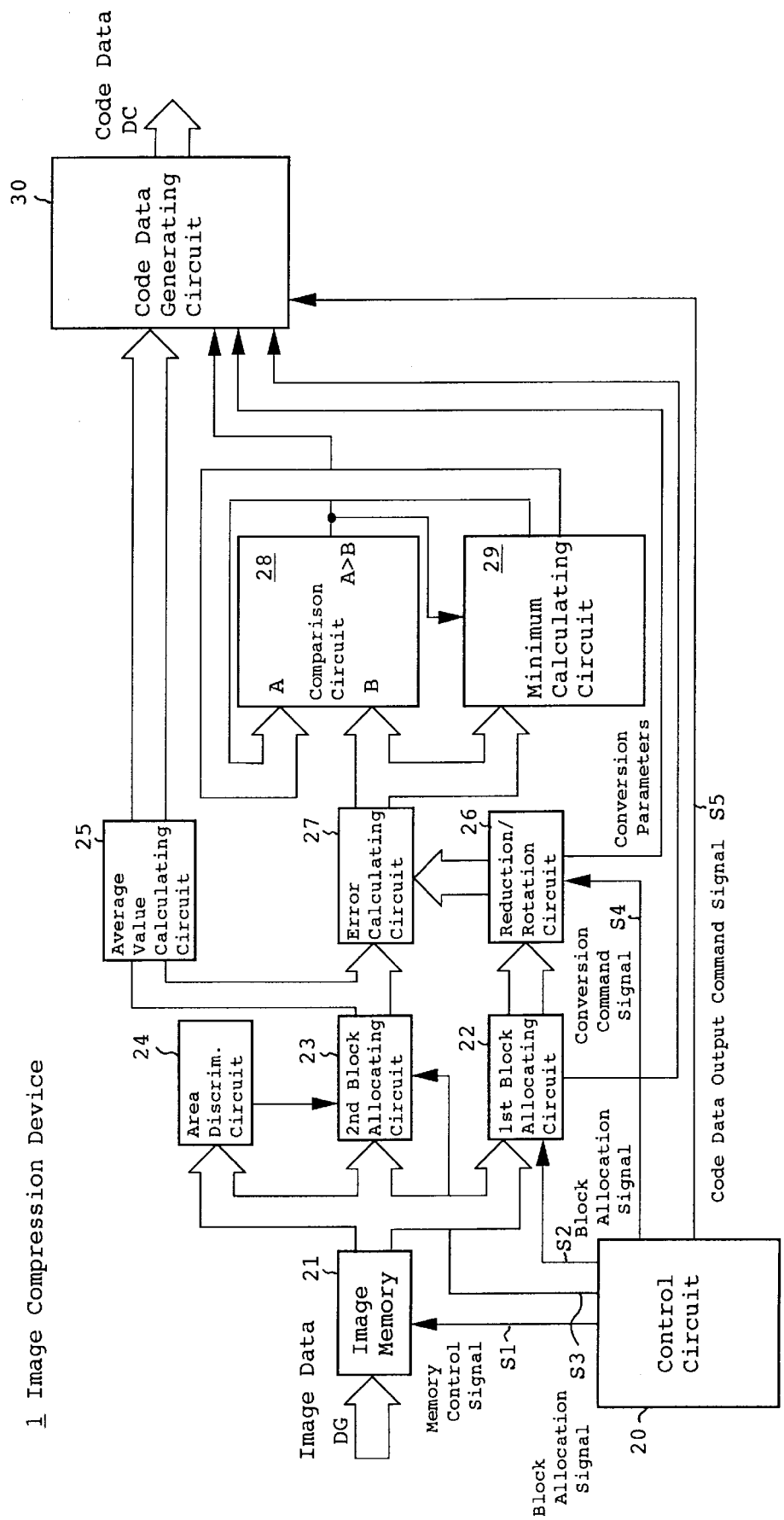
FIG. 3 is a block diagram of the image compression device in accordance with the present invention.
Figure 4:
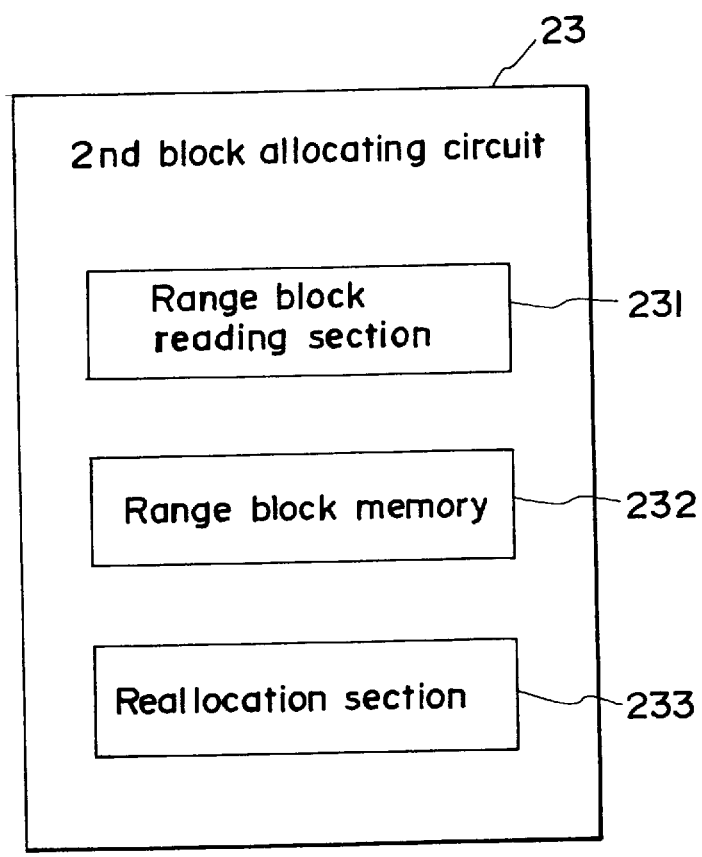
FIG. 4 shows the construction of a second block allocating circuit in accordance with the present invention.
Figure 5:
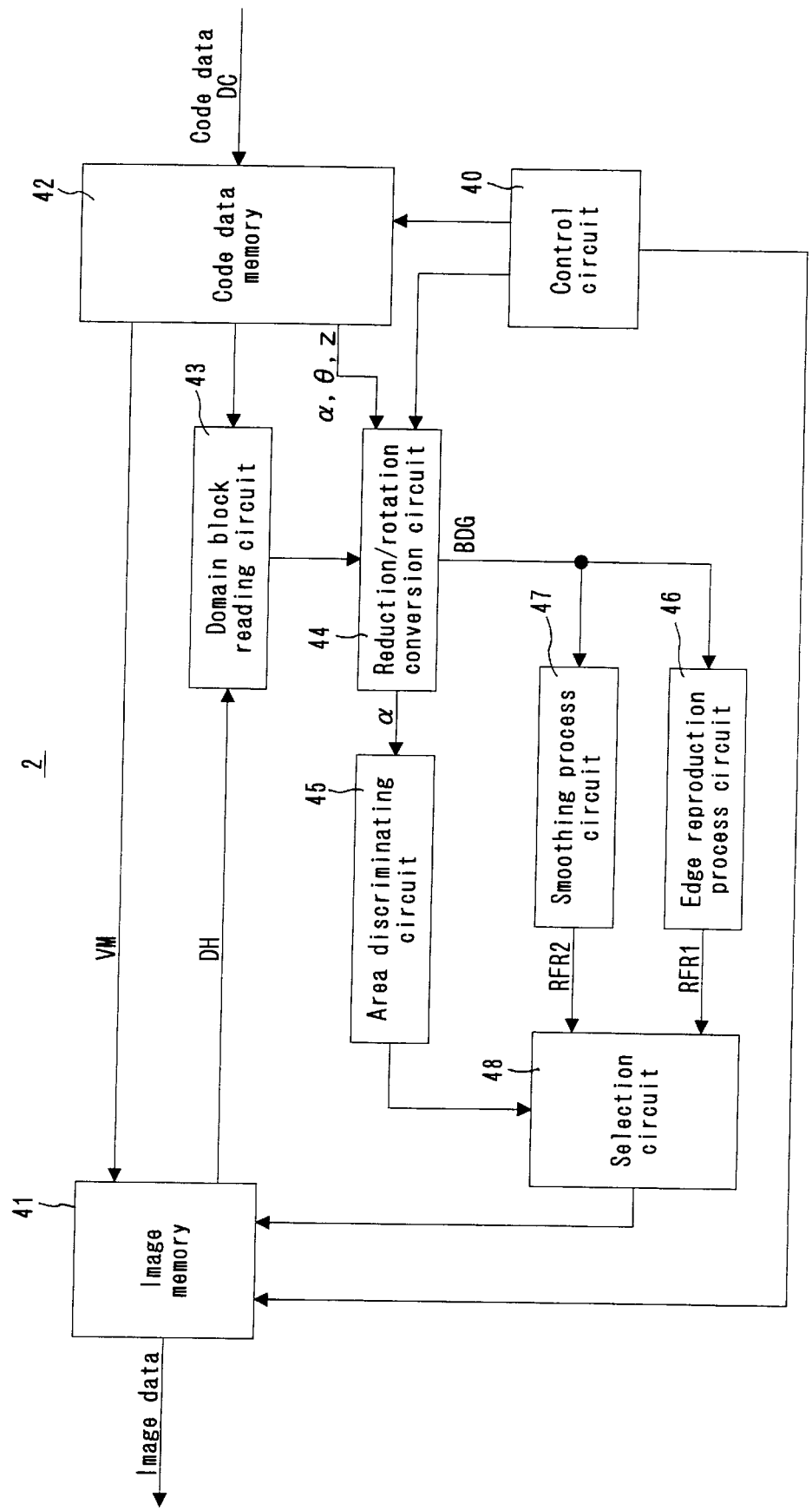
FIG. 5 is a block diagram of the image restoration device in accordance with the present invention.

FIG. 3 is a block diagram of an image compression device 1 of the present invention; FIG. 4 shows the construction of the second block allocating circuit 23; and FIG. 5 is a block diagram of the image restoration device 2 of the present invention.

In FIG. 3, image compression device 1 comprises a control circuit 20, image memory 21, first block allocating circuit 22, second block allocating circuit 23, area discriminating circuit 24, average value calculating circuit 25, reduction/rotation conversion circuit 26, error calculating circuit 27, comparison circuit 28, minimum error calculating circuit 29, and code data generating circuit 30.

Image memory 21 stores, in one page units, the image data DG of original image GF input for image compression. The image data DG stored in image memory 21 are read out in block units by first block allocating circuit 22 and second block allocating circuit 23. That is, the image data DG of original image GF is read out by each domain block BD by the first block allocating circuit 22, and read out by each range block BR by the second block allocating circuit 23, as shown in FIG. 8.

The first block allocating circuit 22 reads out image data DG from image memory 21 for each domain block BD, and stores the image data DG of a single read domain block BD. The first block dividing circuit 22 outputs image data DG of the stored domain block BD to the reduction/rotation conversion circuit 26. The position information (hereinafter referred to as block position information) in the original image GF of the stored domain block BD is output to the code data generating circuit 30, and code data generating circuit 30 stores the block position information in an internal memory. The block position information may be, for example, the number of coordinates of domain block BD in the original image GF.

The second block allocating circuit 23 reads out the image data DG from image memory 21 for each range block BR, and stores the image data DG of a single read range block BR. As shown in FIG. 4, the second block allocating circuit 23 is provided with a range block reading section 231, range block memory 232, and reallocation section 233. Range block reading section 231 reads the image data DG from image memory 21 for each range block BR, range block memory 232 stores the image data DG of the read range block BR, and reallocation section 233 reallocates the range block BR in accordance with the discrimination results of area discriminating circuit 24.

Area discriminating circuit 24 discriminates the range blocks BR stored in range block memory 232. Area discrimination is accomplished by determining whether or not and edge area (containing an edge) of the image is included in range block BR. In this discrimination, an edge area is determined when the difference between the maximum density value Cmax and the minimum density value Cmin (Cmax–Cmin) of pixels contained in the target range block BR exceeds a constant reference value A. When, for example, the density is 256 grayscales (8-bits per pixel) an edge area is determined if the difference (Cmax–Cmin) is 64 or greater. When an edge area is discriminated, the range block BR often has portions of text area, whereas when an area is not discriminated as an edge area, the range block often has portions of photographic area. Thus, text areas and photographic areas can be discriminated by determining whether or not an area is an edge area.

In the aforesaid second block allocating circuit 23, reallocation section 233 divides the range block BR into quarters when the range block BR is an edge area. In the edge area, the ranges quartered by reallocation section 233 are designated range blocks BR. As previously described, the range blocks BR reallocated by reallocation section 233 are referred to as reallocated range blocks BRR to distinguish them from the unreallocated range blocks BR. Therefore, the second block allocating circuit 23 outputs once the image data DG of the range block BR stored in range block memory 232 when the range block BR read out from image memory 21 is not an edge area, and outputs four times the image data DG of the reallocated range blocks BRR reallocated by the reallocation section 233 when the range block BR is an edge area.

The average value calculating circuit 25 calculates the average value VM of image data DG of the reallocated range block BRR and the range block BR output from the second block allocating circuit 23.

The average value VM may be, for example, a simple average value of density of the image data DG, or may be an average value of error calculated from a reference density value. The calculated average value VM is output to code data generating circuit 30, and stored in memory of the code data generating circuit 30. The average value VM may be used as the initial image for image restoration.

The reduction/rotation conversion circuit 26 reduces, by a specified reduction ratio α, the image data DG of the domain block BD output from the first block allocating circuit 22 to obtain the reduced pattern BDP1. Various methods may be used for reduction, e.g., methods which simply cull pixels of image data DG, or methods which cull pixels after calculating an average value of two or more pixels. The reduction ratio α is a value required to compress the domain block BD to the size of the range block BR or the reallocated range block BRR. Therefore, the reduction ratio a will differ depending on whether or not the range block BR is an edge area. For example, the reduction ratio α may be ¼ for non-edge areas, and ¹⁄₁₆ for edge areas.

The obtained reduced pattern BDP1 is subjected to rotation conversion at specified rotation angles θ. There are four rotation angles θ, i.e., 0°, 90°, 180°, and 270°, such that four reduced patterns BDP1~4 are obtained by rotation conversion. These reduced patterns BDP1~4 are subjected to density inversion conversion to obtain reduced patterns BDP5~8. The density inversion conversion inverts the black/white data. Thus, a total of eight reduced patterns BDP1~8 are obtained. These obtained reduced patterns BDP1~8 are output in their sequence of generation to error calculating circuit 27. The reduction ratio α, rotation angles θ, density inversion information Z, conversion coefficients (conversion parameters) used by reduction/rotation conversion circuit 26 are output to code data generating circuit 30, and stored in memory. Reduction conversion, rotation conversion, density inversion, are accomplished by a mode of affine transformation.

Error calculating circuit 27 calculates and outputs error δ of the range block BR output from the second block allocating circuit 23 relative to the reduced patterns BDP1~8 output from reduction/rotation conversion circuit 26. This error δ is obtained by, for example, calculating the mean square of the density difference of each pixel.

Comparison circuit 28 compares the error δB output from error calculating circuit 27 and the minimum value δA of the error up to the previous cycle, and outputs a high level signal when the present error δB is less than the minimum value δA.

The minimum error calculating circuit 29 stores the value of error δ input from error calculating circuit 27 as minimum value δA when a signal is output from comparison circuit 28, and outputs the minimum value δA to comparison circuit 28 in the next cycle.

Code data generating circuit 30 calculates code data DC based on the average density value VM output from average value calculating circuit 25, signals output from comparison circuit 28, block position information output from first block allocating circuit 22, and conversion coefficient output from reduction/rotation conversion circuit 26. The code data DC is generated for each range block BR, and output in the sequence of generation. Thus, information relating to the position of range block BR is obtained by the sequence of code data DC of a target range block BR in all code data DC. The code data DC output from the code data generating circuit 30 are image compression data of original image GF.

Control circuit 20 outputs memory control signal S1 to image memory 21 to control the reading and writing of image memory 21, outputs block allocation signals S2 and S3 to first block allocating circuit 22 and second block allocating circuit 23 to control conversion operations, and outputs code data output command signal S5 to code data generating circuit 30 to control code data DC generation and output. Furthermore, control circuit provides overall control of the image compression device 1.

In FIG. 5, image restoration device 2 comprises a control circuit 40, image memory 41, code data memory 42, domain block reading circuit 43, reduction/rotation conversion circuit 44, area discriminating circuit 45, edge reproduction process circuit 46, smoothing process circuit 47, and selection circuit 48.

Image memory 41 is a memory for storing image data DH of one restored page of the restored image RF. The average density value VM of each range block BR stored in code memory 42 as an initial image is written to image memory 41.

Code data memory 42 is a memory for storing code data DC input for the restoration process. At the start of the restoration process, an initial image is generated in image memory 41 by the average density value VM contained in the code data DC, and thereafter the code data DC is sequentially read out for processing of each range block BR.

Domain block reading circuit 43 reads out the image data DH of domain blocks BD from image memory 41 and outputs the data to reduction/rotation conversion circuit 44 based on the position information of domain block BD contained in the code data DC.

Reduction/rotation conversion circuit 44 accomplishes reduction conversion of the image data DH of the read domain block BD using the reduction ratio a contained in the code data DC, accomplishes rotation conversion using rotation angles θ, and accomplishes density inversion conversion in accordance with the density inversion conversion information Z, and after the conversion processes, outputs image data DH of rotation conversion image BDG to edge reproducing process circuit 46 and smoothing process circuit 47.

Edge reproducing process circuit 46 subjects the image data DH of the input rotation conversion image BDG to an edge reproducing process, and outputs image data DH for range restored image RFR1. Smoothing process circuit 47 subjects the image data DH of the input rotation conversion image BDG to a smoothing process, and outputs image data DH for range restored image RFR2.

Area discriminating circuit 45 detects the size of range block BR via the reduction ratio a contained in the code data DC, discriminates whether or not the area is an edge area via the size, and outputs the discrimination result to selection circuit 48. For example, a non-edge area is discriminated when the reduction ratio a is ¼, and an edge area is discriminated when the reduction ratio α is ¹⁄₁₆.

Selection circuit 48 selects image data DH output from edge reproducing process circuit 46 when an edge area discrimination result is output from area discriminating circuit 45, and selects image data DH output from smoothing process circuit 47 when the discrimination result is a non-edge area, and writes the selected image data DH to image memory 41.

For all code data stored in code data memory 42, the restored image RF stored in image memory 41 is refreshed by a single occurrence of the aforesaid process. The restored image RF near the original image GF is written to image memory 41 by repeating the aforesaid process a number of times.

Control circuit 40 controls the overall image expansion device 2. Control circuit 40 may work in common with control circuit 20 of the image compression device 1.

The processing operation of the image compression device 1 and image restoration device 2 are described hereinafter with reference to the accompanying flow charts.

Figure 6:
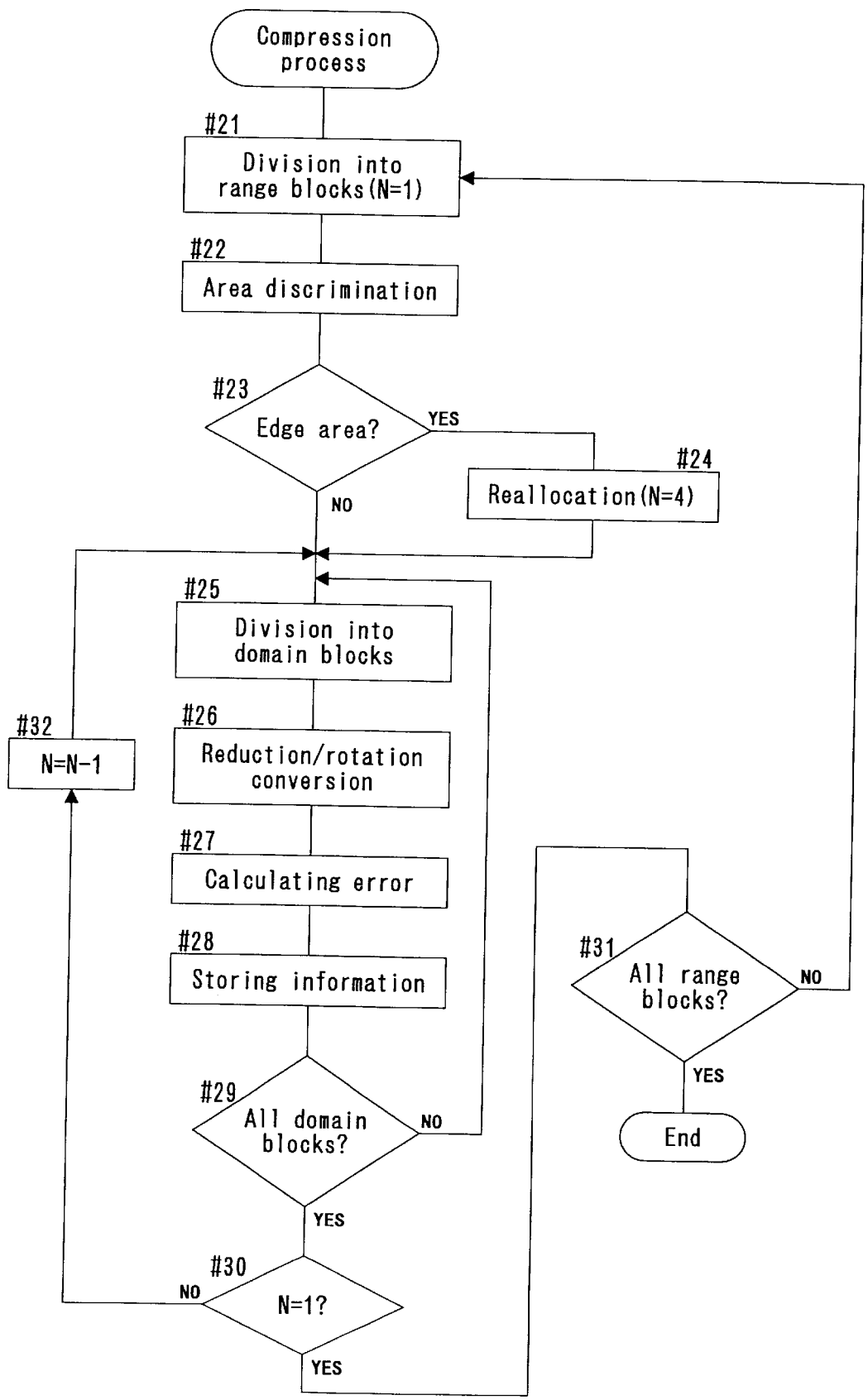
FIG. 6 is a flow chart of the compression process performed in the image compression device in accordance with the present invention.
Figure 7:
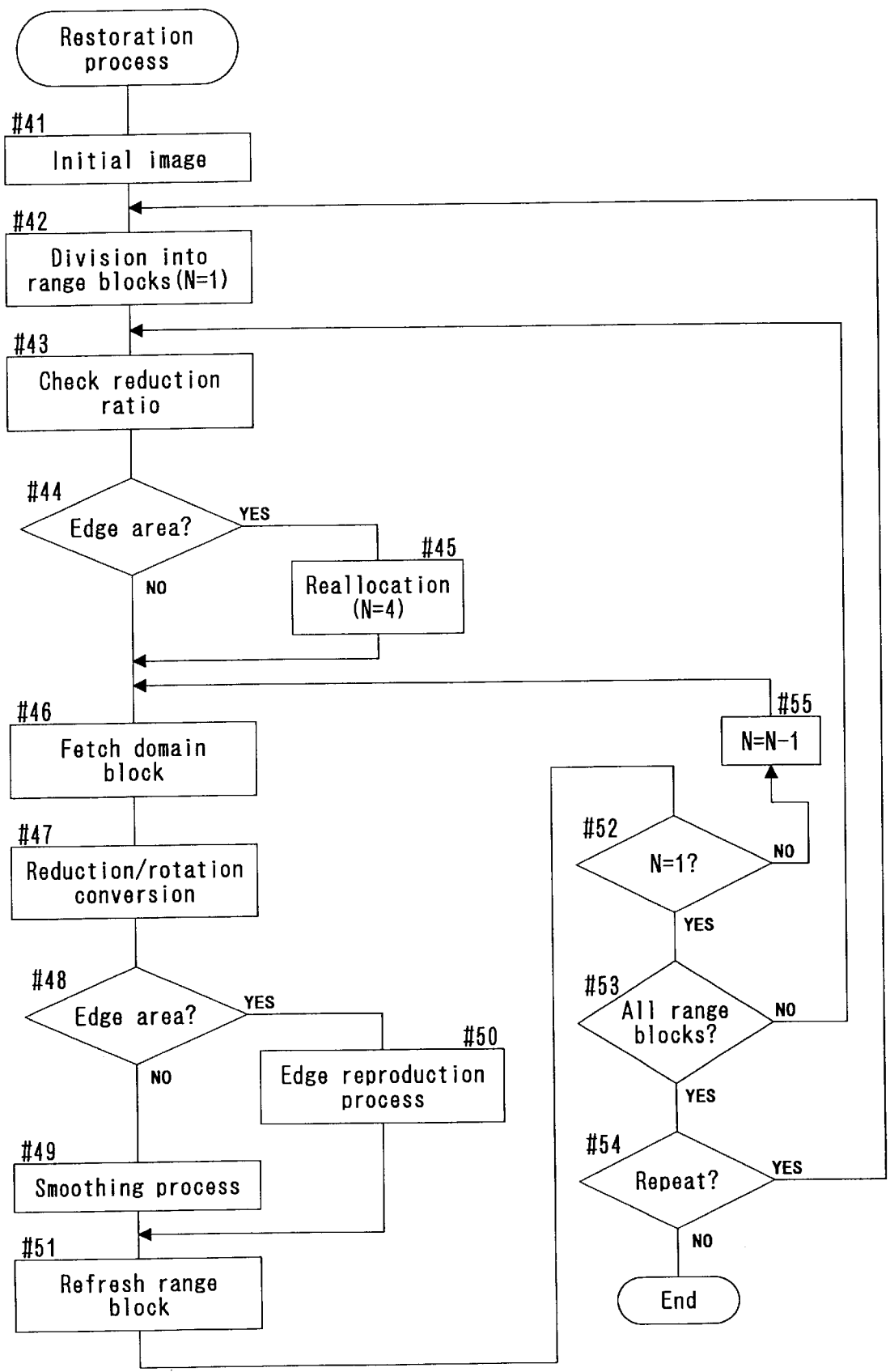
FIG. 7 is a flow chart showing the restoration process in accordance with the present invention.

FIG. 6 is a flow chart showing the sequence of the compression process (encoding process) of image compression device 1, and FIG. 7 is a flow chart showing the sequence of the restoration process (decoding process) of the image restoration device 2.

In FIG. 6, the original image GF, which is the object image for encoding, is divided into range blocks BR, and a single allocated range block BR is retrieved (#21). The allocated range block BR is subjected to area discrimination (#22), and when discriminated as an edge area (#23: YES), the range block BR is reallocated (#24).

Then, the original image GF is divided into domain blocks BD (#25), and a retrieved domain block BD is subjected to reduction conversion, rotation conversion, and density inversion conversion to obtain eight reduced patterns BDP1~8 (#26). The error δ is calculated for the range block BR and reduced patterns BDP1~8 (#27), the minimum error δ reduced patterns BDP1~8 are selected, and the position information and conversion parameters of the domain block BD are stored (#28). The aforesaid processes are executed for all domain blocks BD (#29), and the position information and conversion parameters of the one domain block BD having the minimum error δ are selected from the entire original image GF, and the selected information is stored as the code data DC of that range block BR (#28). When the area discrimination result is an edge area, the aforesaid processes are repeated for the reallocated range blocks BRR (#30, #32). Encoding is thus accomplished for all range blocks BR (#31).

In FIG. 7, an initial image identical in size to the original image GF is designated the restored image RF (#41), and the restored image RF is divided into a plurality of range blocks BR (#42). Then, the size of the range block BR is checked from the reduction ratio α contained in the code data DC corresponding to the range block BR (#43). When the size has been reallocated, i.e., when the area is an edge area (#44: YES), the range block BR is reallocated (#45).

The image data at the position of the domain block BD contained in code data DC corresponding to range data BR are retrieved from the restored image RF (#46), and subjected to conversion processes based on the reduction ratio α, rotation angles θ, and density inversion information Z contained in code data DC (#47). When an edge area is discriminated by checking the result in step #43 (#48: YES), the data are subjected to the edge reproducing process (#50), whereas when a non-edge area is discriminated (#48: NO), the data are subjected to a smoothing process (#49).

The range block BR is refreshed by substituting the range restored image RFR obtained by the above-described processes for the range block BR (#51), and in the case of an edge area, the aforesaid process is repeated for the reallocated range blocks BR (reallocated range blocks BRR) (#52, #46). The aforesaid process is executed for all range blocks BR (#53). Thus, a restored image RF is obtained nearer the original image GF than the initial image. The aforesaid process is repeated only a set number of times (#54). A restored image RF nearer to the original image GF is obtained by the aforesaid process.

According to the present embodiment, when the range block BR is an edge area, i.e., a text area, the size of the range block BR is reduced by quartering the range block BR. Thus, image reproducibility is excellent because most range blocks BR do not contain edge areas, and image defects of text areas in particular is suppressed. Moreover, when the range block is not an edge area, i.e., when the range block is a photographic area, the range block is not reduced in size needlessly because the range block BR is not reallocated, such that the amount of compression data does not increase and the reduction ratio can be increased, as well as reducing the time required for processing.

Although there are different image characteristics such as contrast and the like between text areas and photographic areas, the size of the range blocks in the respective areas cannot be selected in the conventional art. That is, a text area has a sharp contrast and includes edges such that smaller size range blocks are desirable, whereas a photographic area does not contain edges and may therefore the range blocks may be of larger size. In the present embodiment, a high reduction ratio and improved image quality is obtained by reducing the size of the range blocks BR in regions containing edges necessary for improved image quality, and by not reducing the range blocks BR of regions that do not contain edges.

Since the size of the range blocks BR differ in accordance with the result of area discrimination, the area discrimination can be known by the reduction ratio α or the size of the range block BR. Accordingly, the information of the area discrimination result may be added to the code data DC without increasing the amount of compression data.

According to the present embodiment, image quality can be improved even more in the restoration process because detecting whether or not a range block BR is an edge area, and subjecting data to an edge process when block BR is an edge area, subjecting the data to a smoothing process when the block area is a non-edge area, so as to obtain a range restored image RFR. Furthermore, area discrimination is accomplished simply and accurately by means of the reduction ratio α contained in code data DC without using special data to determine whether or not an area is an edge area.

Although, in this embodiment, the domain block BD is read from the restored image RF during the restoration process, various density patterns may be stored beforehand in a special reference memory to be used as domain blocks BD and the density pattern of the domain block BD may be read out from the reference memory without reading the domain blocks BD from the restored image RF. For example, 32 types of binary density patterns may be set beforehand for text areas (edge areas) as the aforesaid density pattern. In such an instance, 64 types of patterns are obtained by density inversion and when the size of the range block BR is 8×8 pixels, there is one pattern having an error δ of zero [0] for the range block BR. Thus, a range restored image RFR of completely restored range blocks BR can be obtained by a single restoration process, thereby greatly reducing the time required for restoration processing, and improving image quality.

In the embodiments described herein, reallocated range blocks BRR are obtained by quartering the range block BR, but is to be understood that divisions of 2,3, 6, and 8 blocks and the like are possible. Although reduced patterns BDP1~8 are generated in the conversion process, 7 or fewer, or 9 or more reduced patterns BDP may be created. The conversion process may by a mirror inversion process. The sizes of the range block BR and domain block BD may be sizes other than those used in the aforesaid embodiment Furthermore, the construction of the entire image compression device 1 and image restoration device 2, either in whole or in part, and the content, sequence and timing of processes and the like may be variously modified insofar as the modifications do not depart from the scope of the present invention.

This aspect of the present invention provides a fractal image compression device having a high image reduction ratio without loss of image quality by varying the size of range blocks during compression in accordance with area discrimination.

This aspect of the present invention also suppresses loss of image quality of text areas in particular by improving edge reproducibility by reducing the range blocks containing edges through reducing the number of range blocks of edge areas.

This aspect of the present invention additionally provides 4 provide restored images without loss of image quality by executing suitable processing in accordance with the results of area discrimination of range blocks when an image is restored.

This aspect of the present invention provides simple and accurate area discrimination by appending information of area discrimination results to code data without increasing the amount of compression data because area discrimination of range blocks is accomplished based on the reduction ratio contained in the conversion parameters.

Second Aspect of the Invention

The fractal image compression principle of the present invention is described hereinafter.

Figure 9:
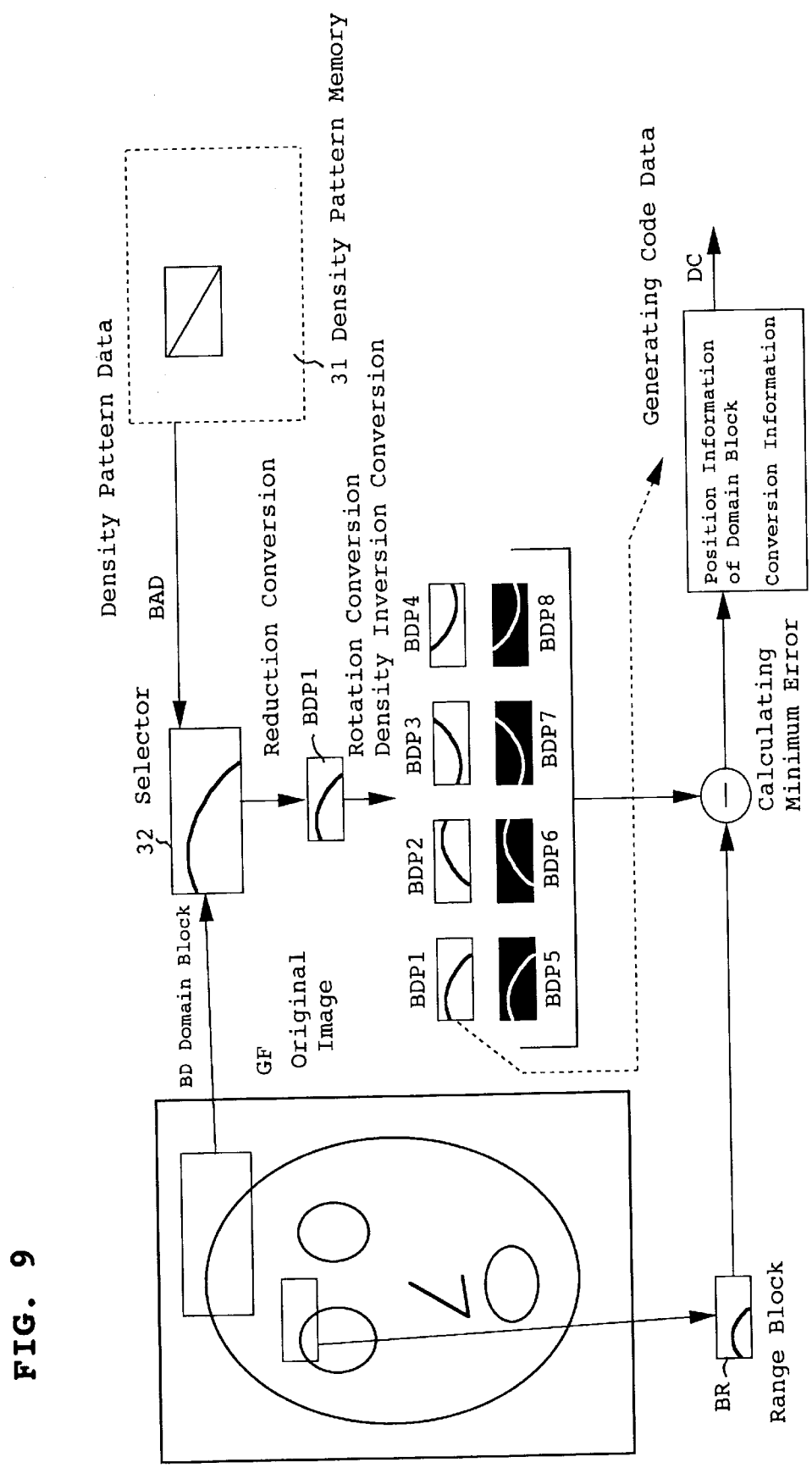
FIG. 9 shows the fractal image compression in accordance with a second aspect of the present invention.
Figure 10:
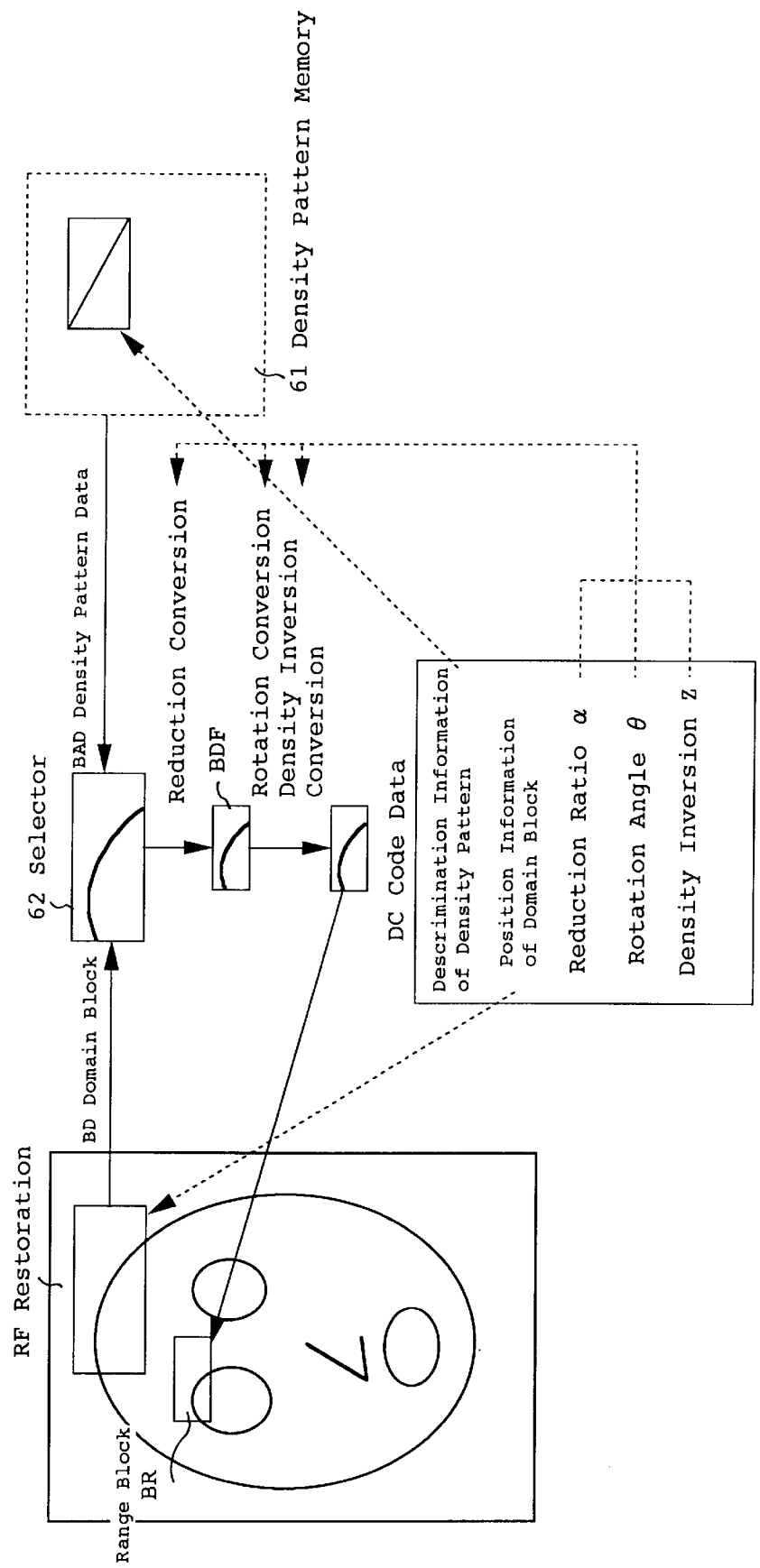
FIG. 10 shows the image restoration of a compressed fractal image in accordance with the present invention.
Figure 16:
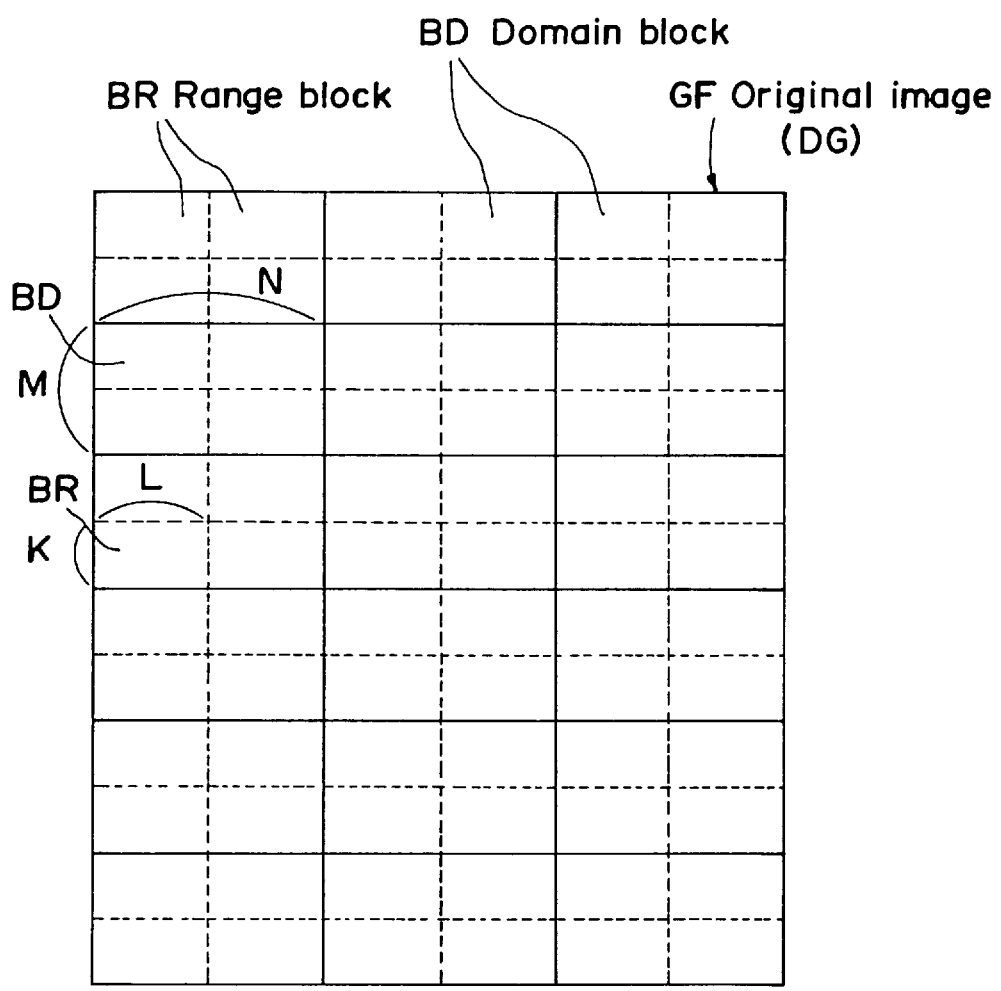
FIG. 16 shows the relationship between the domain block and the range block in an original image in accordance with the present invention.

FIG. 9 shows a fractal image compression device according to a second aspect of the present invention. FIG. 10 briefly shows a fractal image restoration device for restoring compressed fractal image data according to this second aspect. FIGS. 12(a)–12(d) show examples of density pattern data BAD; FIG. 16 is an illustration showing the relationship between range blocks BR and domain blocks BD in original image GF. In FIG. 9, items identical to those of the conventional technology described in FIG. 32 are omitted or abbreviated in the following discussion.

In FIG. 9, original image GF is divided into a plurality of range blocks BR (block size: K×L). Minimum error is calculated for each allocated range block BR. At this time, the density pattern data BAD of the range block which is the object of error comparison are first sequentially read out from density pattern memory 31.

Density pattern data BAD are blocks of the same block size (M×N: M>K, N>L) as domain blocks BD of original image GF, for which various patterns comprising black and white binary images are prepared, as shown in FIGS. 12(a)–12(d), and stored in density pattern memory 31. Density pattern data closely express text image edge areas, such that the error is very small relative to range blocks containing edge areas, and such error may approach zero at times.

Reduced pattern BDP1 which is the same size as the range block BR is generated by subjecting the density pattern data BAD read from density pattern memory 31 to reduction conversion. A total of eight types of reduced patterns BDP1-8 are obtained by subjecting the reduced pattern BDP1 to rotation conversions of 0°, 90°, 180°, and 270°, and performing density inversion conversions on the obtained reduced patterns BDP1~4.

Relative to one range block BR, each reduced pattern BDP1~8 of all density pattern data BAD stored in density pattern memory 31 are compared to calculate error, and the reduced pattern BDP of the density pattern data BAD having the smallest error is selected. Discrimination information of the selected density pattern data BAD, and information relating to the conversion parameters of the reduced patterns BDP are output as range block BR code data when the error of the selected density pattern data BAD is less than a threshold value. The density pattern discrimination information may include, for examples, the density pattern data BAD, the type of density pattern data BAD, and the position or number of the density pattern data BAD selected from among all density pattern data BAD.

When the error of a selected density pattern data BAD is not less than a set threshold value, i.e., when the error of any density pattern data BAD is not less than a threshold value, the domain blocks BD of an original image GF are sequentially allocated, and the allocated domain blocks BD are subjected to processes such as reduction conversion, rotation conversion, density inversion, and error calculation. The domain block BD having the minimum error among the aforesaid domain blocks and its reduced patterns BDP are selected.

The average density value VM is calculated for the range block BR, and code data DC are generated based on the calculated average value VM, discrimination information of minimum error density pattern BAD and position information of domain block BD, and the conversion information (conversion parameters) of reduced patterns BDP1~8, i.e., reduction ratio (reduction conversion coefficient) a, rotation angle (rotation conversion coefficient) θ, and density conversion Z. Range block BR is often a normal square, e.g., 8×8 pixels, 4×4 pixels or the like. Domain block BD often has a shape similar to range block BR, albeit larger in size. When domain block BD is 8×8 pixels in size, the density pattern data BAD comprises, for example, 32 units of data. Sixty-four different reduced patterns of the density pattern are obtained by subjecting the 32 density pattern data BAD to reduction conversion and density inversion.

In FIG. 10, restored image RF is a restored (expanded) image approaching the original image GF in accordance with repeated restoration processing, and an initial image is created at the start of the restoration process. An initial image is set, for example, by the average density value VM of each range block BR contained in code data DC. In the restoration process, the density pattern data BAD are extracted from density pattern memory 61, and the domain block BD is extracted from restored image RF based on the position information of domain block BD and the discrimination information of the density pattern data BAD contained in the initial code data DC. The extracted density pattern data BAD and domain block BD are subjected to reduction conversion using the reduction ratio α contained in the code data DC to obtain reduced image BDF. The reduced image BDF is converted using rotation conversion using rotation angle θ in accordance with density inversion conversion Z to obtain range restored image RFR. The range restored image RFR is used to refresh the restored image RF by the range blocks BR. All range blocks BR, i.e., all code data DC, of restored image RF are refreshed once by a single cycle of the aforesaid process.

The aforesaid process is repeated to obtain a restored image RF near the original image GF. Thus, the repetitive conversion encoding method is used to accomplish image compression and restoration.

The construction and operation of the image compression device 1 of the present invention are described hereinafter.

Figure 11:
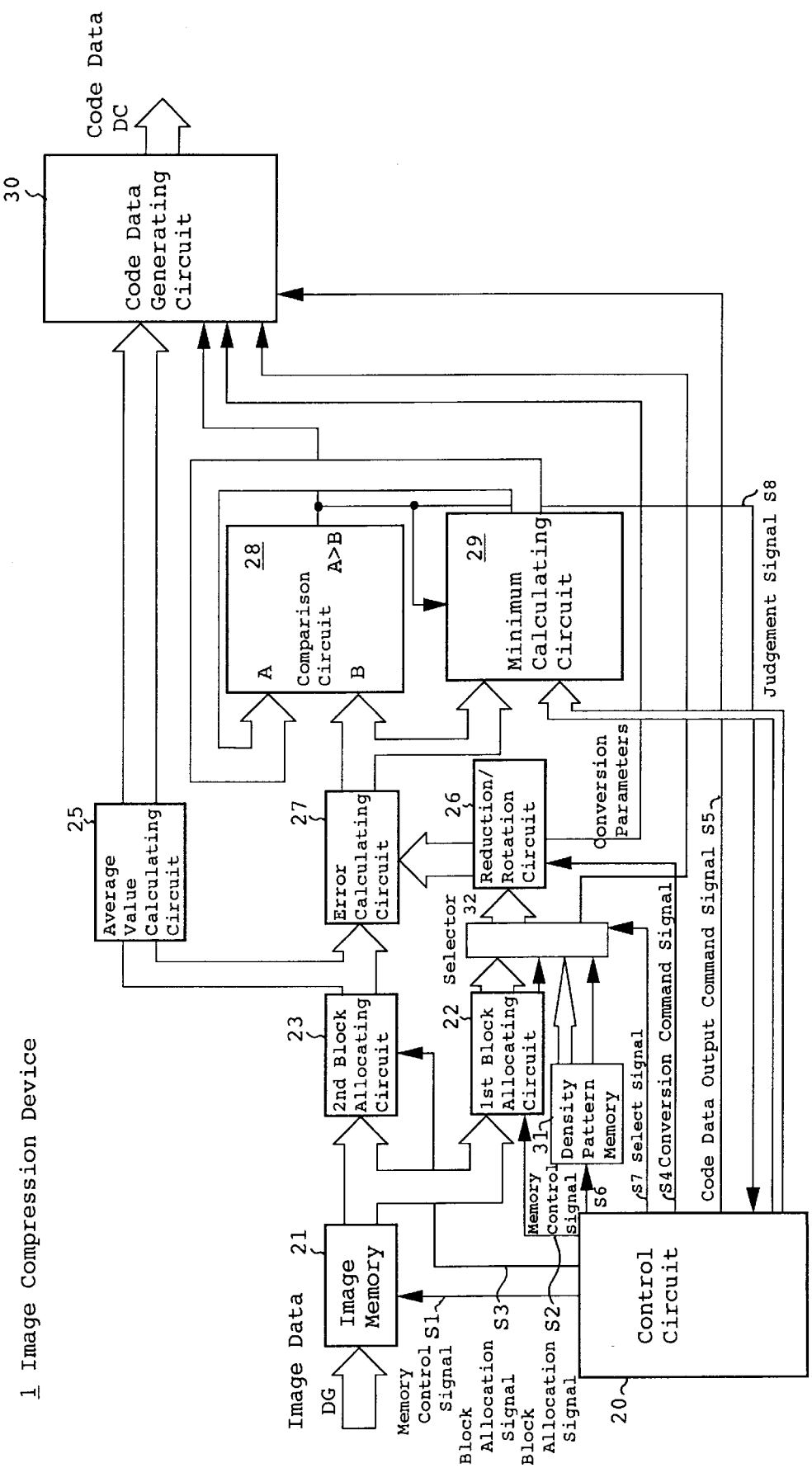
FIG. 11 is a block diagram of the image compression device in accordance with a second aspect of the present invention.
Figure 13:
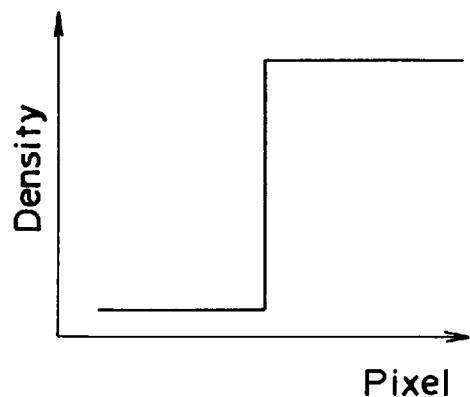
FIGS. 13(a)–13(c) show examples of a density pattern generated by density pattern conversion in accordance with the present invention.
Figure 13:
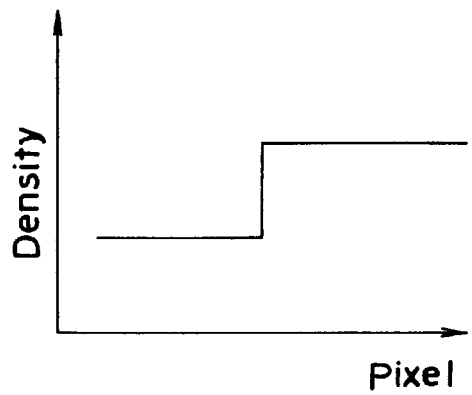
Figure 13:
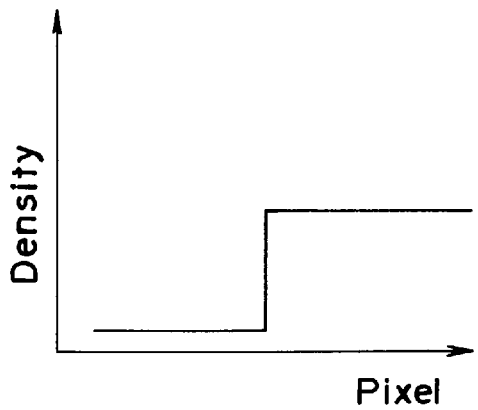

FIG. 11 is a block diagram of the image compression device 1 according to the second aspect of the present invention. FIG. 13 is an illustration showing examples of density patterns generated by density pattern conversion. In FIG. 11, items identical to those of the embodiment of FIG. 1 are omitted or abbreviated in the following discussion.

In FIG. 11, image compression device 1 comprises a control circuit 20, image memory 21, first block allocating circuit 22, second block allocating circuit 23, average value calculating circuit 25, reduction/rotation conversion circuit 26, error calculating circuit 27, comparison circuit 28, minimum error calculating circuit 29, and code data generating circuit 30, density pattern memory 31, and selector 32.

Density pattern memory 31 stores density patterns data BAD 14, as shown in FIG. 12. The stored density pattern data BAD are sequentially read from density pattern data 31, and output together with the discrimination information to selector 32.

Selector 32 selectively switches between the image data DG of domain block BD output from block area extracting portion 22 and the density pattern data BAD output from density pattern memory 31 for output to reduction/rotation conversion circuit 26. Either the block position information output from block area extracting portion 22 or discrimination information output from density pattern memory 31 is selectably switched for output to code data generating circuit 30. Code data generating circuit 30 stores block position information or discrimination information in an internal memory. Block position information may be, for example, the number or coordinates of a domain block BD in original image GF.

Reduction/rotation conversion circuit 26 executes reduction conversion at a specified conversion ratio α on the density pattern data BAD or image data DG of the domain block BD output from selector 32 using various methods described hereinbefore. The reduction ratio α is a value required to reduce the domain block BD to the size of the range block BR. For example, the reduction ratio α may be ½, ¼, ⅛, 1/16 and the like.

The minimum error calculating circuit 29 stores the value of error δ input from error calculating circuit 27 as minimum value δA when a signal is output from comparison circuit 28, and outputs the minimum value δA to comparison circuit 28 in the next cycle as in the previous embodiment. Furthermore, the minimum value δA stored in memory and the error threshold value δt output from control circuit 20 are both compared.

Code data generating circuit 30 calculates code data DC based on the average density value VM output from average value calculating circuit 25, signals output from comparison circuit 28, block position information and discrimination information output from selector 32, and conversion coefficient output from reduction/rotation conversion circuit 26. The code data DC is generated for each range block BR, and output in the sequence of generation. Thus, information relating to the position of range block BR is obtained by the sequence of code data DC of a target range block BR in all code data DC. The code data DC output from the code data generating circuit 30 are image compression data of original image GF.

Control circuit 20 outputs memory control signal S1 to image memory 21 to control the reading and writing of image memory 21, outputs block allocation signals S2 and S3 to first block allocating circuit 22 and second block allocating circuit 23 to control conversion operations outputs a conversion command signal S4 to conversion/rotation conversion circuit 26 to control the conversion operation as in the previous embodiment. The control circuit 20 also outputs code data output command signal S5 to code data generating circuit 30 to control code data DC generation and output, outputs memory control signal S6 to density pattern memory 31 to control the readout from density pattern memory 31, and outputs selection signal S7 to selector 32 to control the switching operation of selector 32. Furthermore, control circuit 20 provides overall control of the image compression device 1.

Control circuit 20 controls selector 32 so as to select density pattern data BAD readout from density pattern memory 31 when generating code data DC of a single range block BR, and controls the generation of code data DC of density pattern data BAD with the smallest error δ from among all density pattern data BAD when the error δ of reduced pattern BDP of the density pattern data BAD is less than a threshold δt. When the reduced pattern BDP and error δ of density pattern data BAD is not less than a threshold value δt, the selector 32 is controlled so as to select domain block BD from the first block allocating circuit 22, to generate code data DC for the domain block BD with the smallest error δ among all domain blocks BD.

Figure 12A:
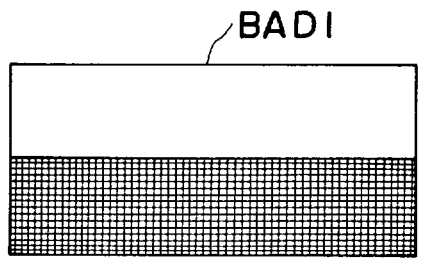
FIGS. 12(a)–12(d) show examples of density pattern data.
Figure 12B:
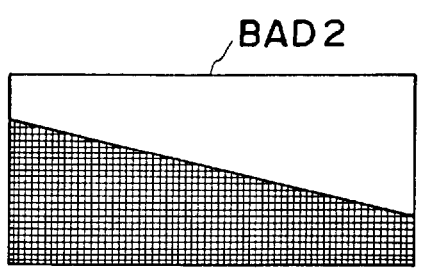
Figure 12C:
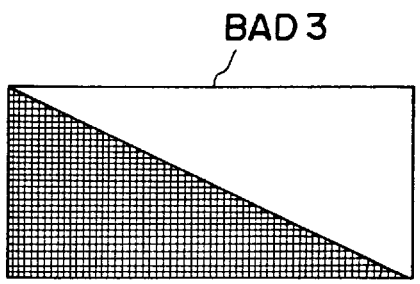
Figure 12D:
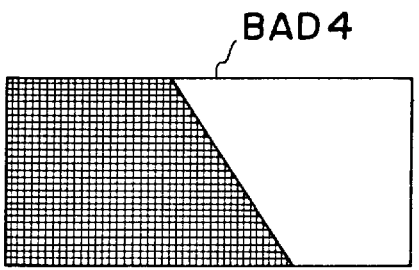

In reduction/rotation conversion circuit 26, the density variation level and mean density level may be optionally converted by density pattern conversion processes such as density translation by adding or subtracting a constant density and the dynamic range of compression or expansion of the density of the density pattern data BAD read from density pattern memory 31. For example, FIG. 13(a) shows the density patterns of density pattern data BAD1 of FIG. 12(a), and FIG. 13(b) shows the density pattern with the smallest density difference by compressing the dynamic range of the density. When a constant density is subtracted from the density pattern of FIG. 13(b), the entire density pattern is translated to the density pattern of FIG. 13(c). This density pattern conversion process has a high degree of applicability to density pattern data BAD not only of text image edge areas, but also other multi-level image data.

The process operation of image compression device 1 is described below with reference to the flow chart.

Figure 14:
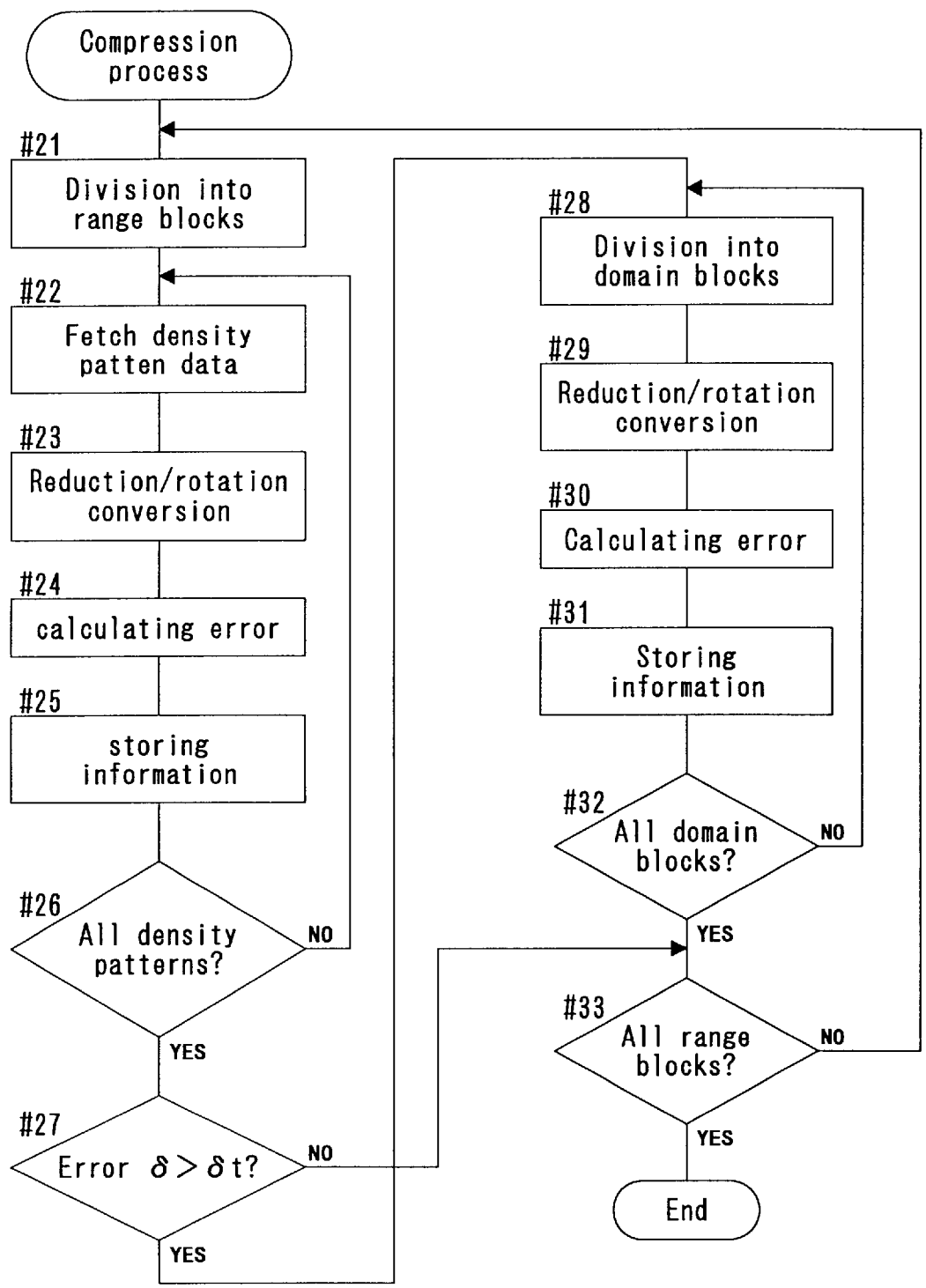
FIG. 14 is a flow chart of the compression process performed in the image compression device in accordance with the present invention.
Figure 15:
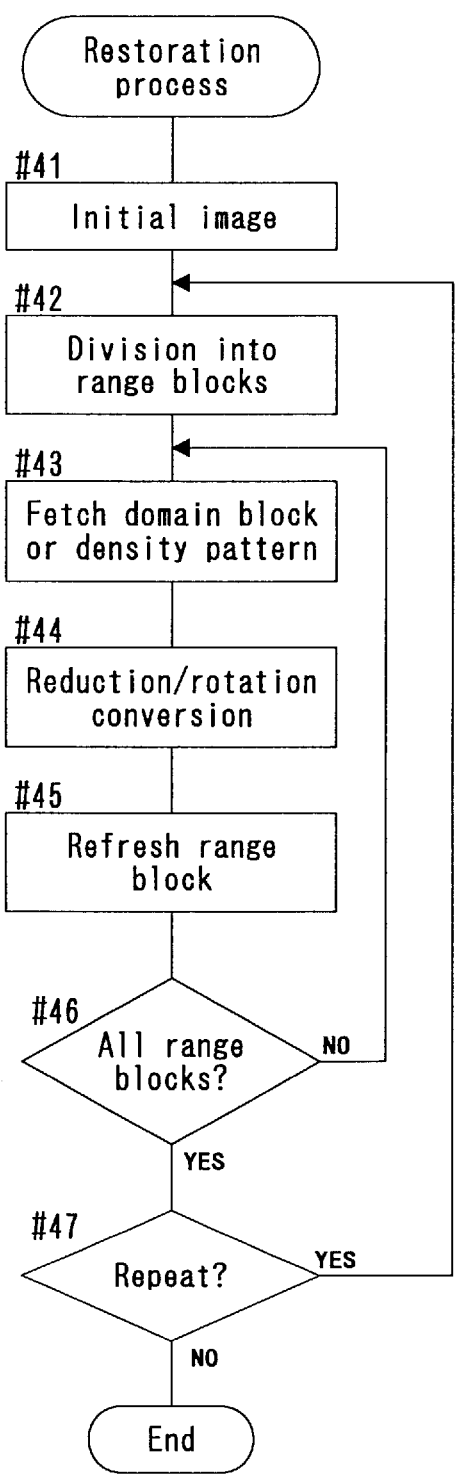
FIG. 15 is a flow chart showing the restoration process in accordance with the present invention.

FIG. 14 is a flow chart showing the compression process (encoding process) in image compression device 1, and FIG. 15 is a flow chart showing the restoration process (decoding process). The image compression device 1 of FIG. 11 shows only the portion for executing the compression process, and the portion for executing the restoration process is not shown. Accordingly, the flow chart of FIG. 15 is described below with reference to FIG. 10. As shown in FIG. 10, the portion for executing the restoration process is provided with selector 62 and density pattern memory 61 for storing the density pattern data BAD identical to the density pattern data stored in density pattern memory 31.

In FIG. 14, an original image GF which is to object of encoding is divided into range blocks BR, and one range block BR is fetched (#21).

Density pattern data BAD are fetched from density pattern memory 31 (#22), and the fetched density pattern data BAD are subjected to reduction conversion, rotation conversion, and density inversion to obtain eight reduced patterns BDP1~8 (#23). The error δ of the range block and reduced patterns BDP1~8 is calculated (#24), and the reduced pattern BDP1~8 with the smallest error δ is selected, and the conversion parameters and discrimination information of density pattern BAD are stored (#25). All the previously described processes are performed on the density pattern data BAD (#26), and one of the density pattern data BAD, i.e., the conversion parameters and discrimination information of the density pattern with the minimum error δ for range block BR, is selected from among all the data stored in density pattern memory 31 (#25).

When the error δ of the stored density pattern data BAD is less than a threshold value δt (#27: NO), the discrimination data and conversion parameters are designated code data DC. When the error 6 of the stored density pattern data BAD is not less than a threshold value δt (#27: YES), the original image GF is allocated into domain blocks BD and fetched (#28), and the fetched domain blocks BD are subjected to reduction conversion, rotation conversion, and density inversion to obtain eight reduced patterns BDP1~8 (#29). The error δ of the range block BR and reduced patterns BDP1~8 is calculated (#30), the reduced pattern BDP1~8 with the minimum error δ is selected, and the conversion parameters and position information of the domain block BD are stored (#31). The aforesaid processed are performed for all domain blocks BD (#32), and one conversion parameter and position information of the domain block BD with the minimum error δ as well as range blocks BR are selected from among the entire original image GF, and the elected information is stored as the code data DC of that range block (#31). All range locks BR are subjected to the encoding process described above (#33).

In FIG. 15, an initial image the same size of the original image GF is set as the restored image RF (#41), and the restored image RF is divided into a plurality of range blocks BR (#42). Then, the image data of the position of the domain block BD or the density pattern data BAD stored in memory is fetched (#43) based on the information contained in code data DC corresponding to range block BR, and conversion processing is executed based on the reduction ratio α, rotation angle θ, and density inversion AZ contained in the code data DC (#44).

The range restored image RFR obtained by the aforesaid process is substituted for the range block BR to refresh the range block BR (#45). The aforesaid precess is performed for all range blocks BR (#46). Thus, a restored image RF is obtained which is nearer to the original image GF than the initial image. The aforesaid process is repeated for a set number of times (#47). The number of repetitions may be set, for example, at 10~20 repetitions. A restored image RF which is nearer to the original image GF is obtained by the above process.

According to the previously described compression device 1, during compression the density pattern data BAD stored in density pattern data memory 31 are checked, and the density pattern data BAD with the smallest error is selected from among the stored data, thereby reducing the time required for compression processing compared to when all domain blocks BD in the original image GF are checked, with the result that compression processing speed is improved. The number of density pattern data are reduced and the time required for checking is also reduced by preparing beforehand the black and white binary image pattern data as density pattern data BAD. Since the error is extremely small or zero for text images, image quality is improved when expanded and processing time is reduced.

During expansion, the edge portion of text images can be completely restored by restoring the density pattern data BAD to its origin by, so as to reproduce the original image GF containing the text image without loss of image quality. When the error is zero during compression, the object range block BR is subjected to a single restoration process to obtain a completely restored range restored image RFR, such that the time required for the restoration process is greatly reduced, and image quality is improved.

In the embodiment described above, the attributes of range block BR may be discriminated, and the either the density pattern data BAD or domain block BD corresponding to the discrimination result may be selected. For example, when a range block BR is a text area or edge area, the density pattern data BAD read out from density pattern memory 31 may be used to generate code data DC, whereas when a range block BR is a photographic area or halftone dot area the domain block BD from the first block allocating circuit 22 may be used to generate code data DC. When the range block BR is a text area, the range block may be reallocated into smaller range blocks. Although reduced patterns BDP1~8 are generated in the conversion process, 7 or fewer, or 9 or more reduced patterns BDP may be created. The conversion process may by a mirror inversion process. The sizes of the range block BR and domain block BD may be sizes other than those used in the aforesaid embodiment. Furthermore, the construction of the entire image compression device 1 and image restoration device 2, either in whole or in part, and the content, sequence and timing of processes and the like may be variously modified insofar as the modifications do not depart from the scope of the present invention.

This second aspect of the present invention provides a fractal image compression device capable of reducing the time required for compression processing, and preventing deterioration of image quality when an image contains, for example, text areas.

Third Aspect of the Present Invention

The fractal image compression principle of the present invention is described hereinafter.

Figure 17:
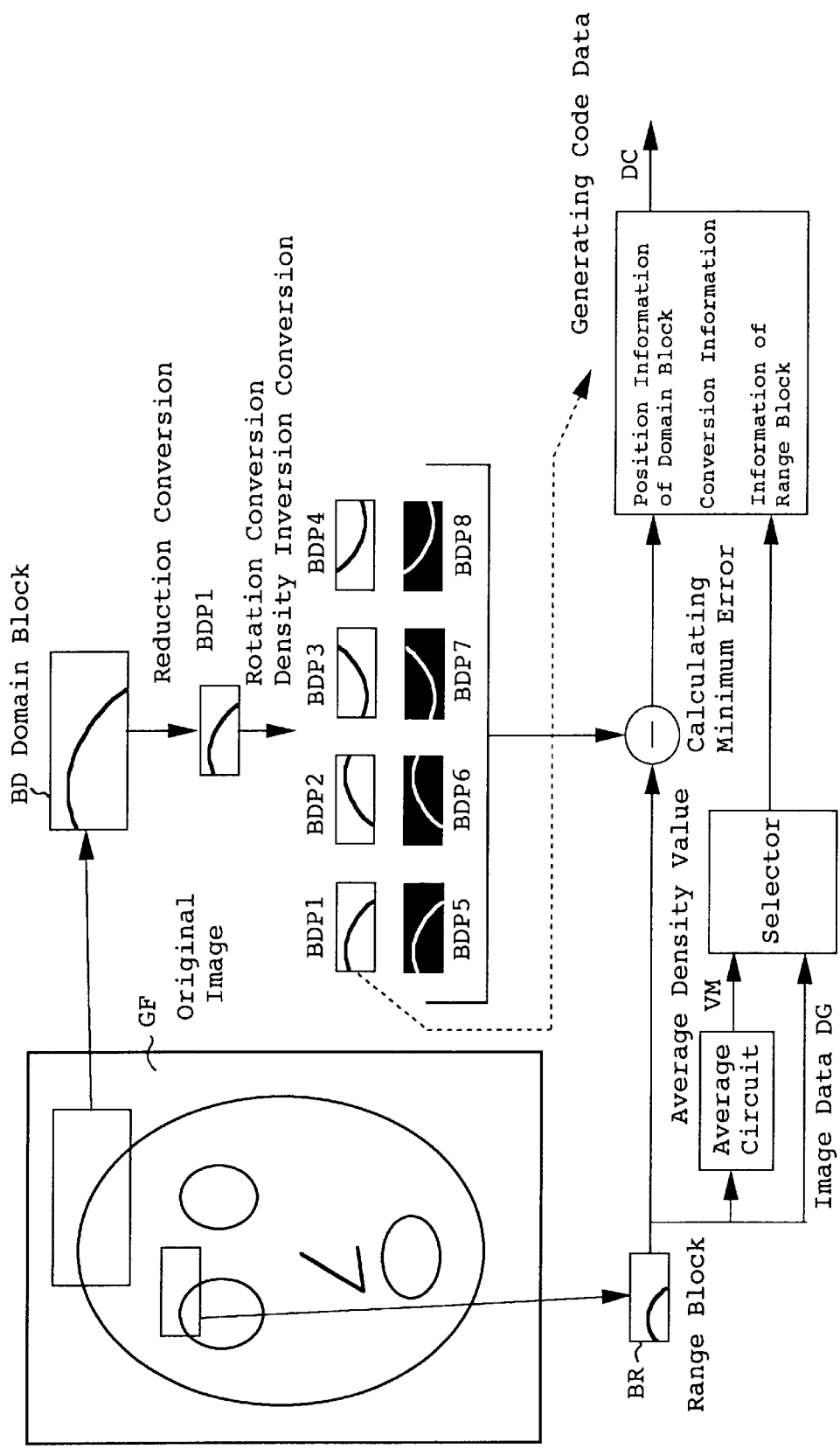
FIG. 17 shows conventional fractal image compression in accordance with the present invention.
Figure 18:
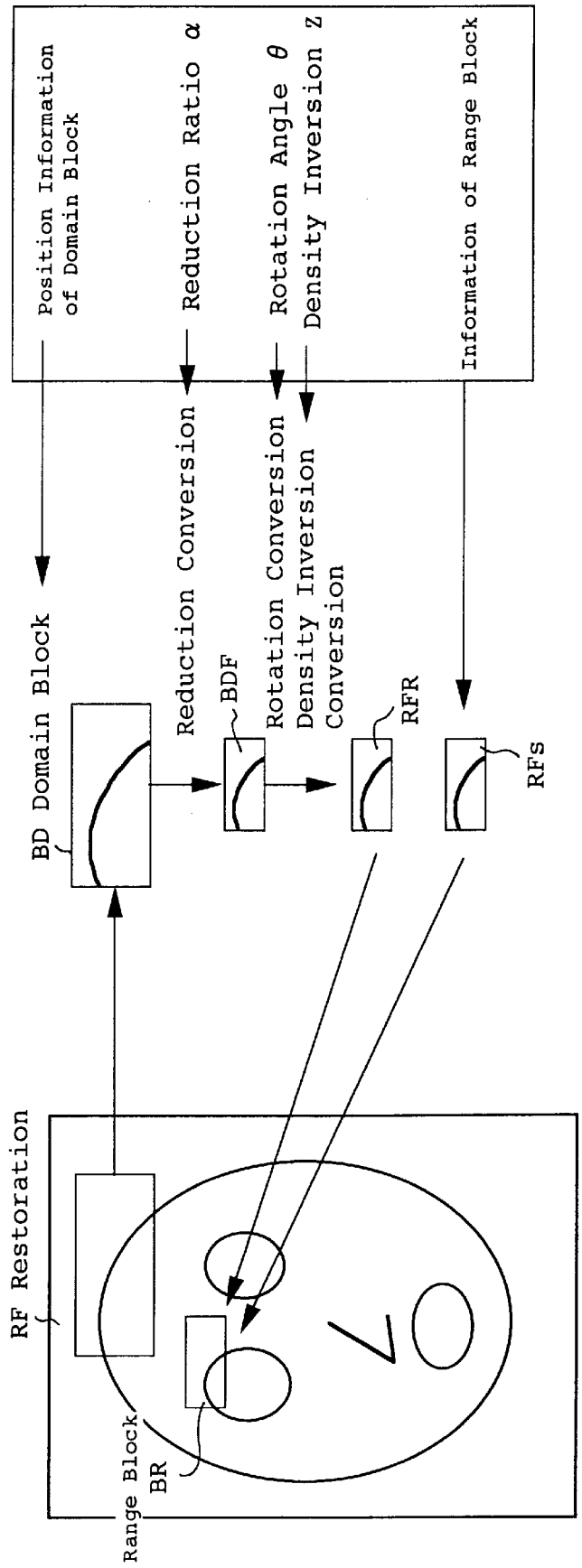
FIG. 18 shows the image restoration of a compressed fractal image data in accordance with the present invention.
Figure 22:
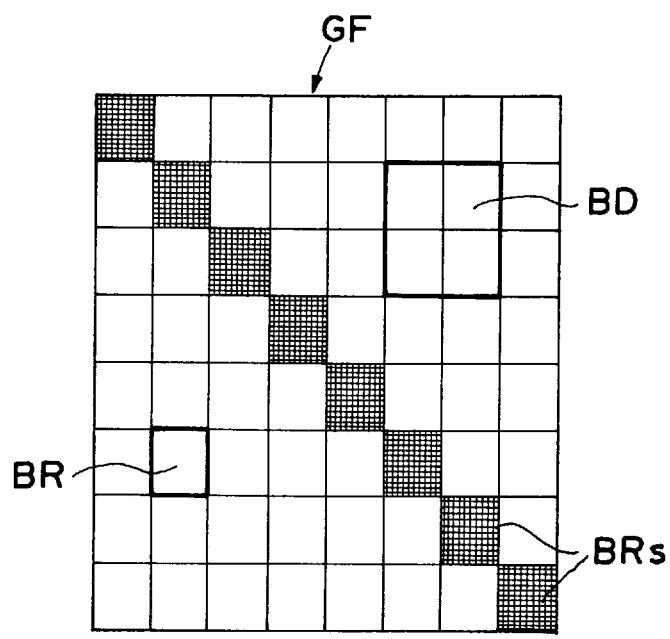
FIG. 22 shows an example of a special range block in accordance with the present invention.

FIG. 17 shows the fractal image compression according to a third aspect of the present invention. FIG. 18 shows the image restoration of compressed fractal image data. FIG. 8 is an illustration showing the relationship between range blocks BR and domain blocks BD in original image GF. FIG. 22 shows an example of special range blocks BRS. In FIG. 17, items identical to those of the conventional technology described in FIG. 32 are omitted or abbreviated in the following discussion.

In FIG. 17, original image GF is divided into a plurality of range blocks BR (block size: K×L) as in the other embodiments. Code data DC are generated in sequence for the allocated range blocks BR, but different code data generating methods may be used depending on whether or not a range block BR satisfies constant conditions.

When a range block BR does not satisfy constant conditions, code data are generated by a conventional method. That is, reduced patterns BDP of all domain blocks BD are compared and error calculated, and the reduced patterns BDP and domain block BD with the minimum error are selected. The average density value VM is calculated for the range block BR, and code data DC are generated based on the calculated average value VM, position information of domain block BD with the minimum error, and the conversion information (conversion parameters) of reduced patterns BDP1~8, i.e., reduction ratio (reduction conversion coefficient) α, rotation angle (rotation conversion coefficient) θ, and density conversion Z.

When range block BR does satisfy the constant conditions (such range blocks BR are hereinafter referred to as special range blocks BRS), the raw image data DC of the range block BR is substituted for the average value VM, i.e., the density value of all pixels in the range block BR, is included in code data DC.

The constant conditions are satisfied when, for example, any of the following conditions (1)–(3) are fulfilled:

(1) When the error of reduced pattern BDP of the most similar block (the domain block BD with the minimum error) of range block BR is greater than a previously set threshold value δt;

(2) when the object original image GF is a predetermined range block BR;

(3) when a range block BR within a domain block BD is selected several times as a most similar block.

In condition (1) above, for example, the error δ of the reduced pattern BDP of the most similar block is compared to a threshold value δt, and the range block BR is designated a special range block BRS when the error δ is greater than the threshold value δt. The value selected as threshold value δt is a value derived from a part of the entire range block BR to be specified as a special range block BRS and which does not obstruct the restoration of the original image GF.

In condition (2), for example, range blocks BR positioned along a diagonal line of original image GF are designated special range block BRS, as shown in FIG. 22. Accordingly, the special range blocks BRS do not require the calculation of error δ nor generation of reduced pattern BDP nor search of domain block BD. When a special range block BRS is confirmed, the density values of all pixels within the special range block BRS are processed for inclusion in the code data DC. Thus, a search of all range blocks BR for a most similar block is not required as in conventional methods, and the time required for searching for a most similar block is reduced, thereby reducing the time necessary for image compression.

In condition (3), for example, after the generation of code data DC for all range blocks BR ends, or during the generation of the code data DC, a range block within a domain block selected numerous times as a most similar block is designated a special range block BRS. The special range block BRS generated in code data DC is substituted for the average density value VM contained in code data DC as raw image data DG.

Information specifying where or not a range block is a normal range block BR or a special range block BRS is incorporated in code data DC. For example, the length of data differs in the raw image data DG and data expressing average density value VM of a range block BR, such that discrimination may be accomplished by the data length. Furthermore, in the case of a special range block BRS, discrimination may be accomplished by setting the single conversion parameter of the reduction ratio α at [0].

Range block BR is often a normal square, e.g., 8×8 pixels, 4×4 pixels or the like. Domain block BD often has a shape similar to range block BR, albeit larger in size. When domain block BD is 8×8 pixels in size with a density of 256 halftones, a single special range block BRS will have raw image data DG of 64 (8×8) bytes.

In FIG. 18, restored image RF is a restored (expanded) image approaching the original image GF in accordance with repeated restoration processing, and an initial image is created at the start of the restoration process. An initial image is set, for example, by the raw image data DG or average density value VM of each range block BR contained in code data DC.

In the restoration process, when a special range block BRS is identified in the code data DC, the raw image data DG contained in the code data DC are used as the restoration image (range restored image) RFs of the range block BR. That is, in this case the portion of the object range block in the restored image RF ends the restoration from the initial image. Thus, other processing is not executed to restore the object range block BR.

In the restoration process, when no special range block BRS is identified, the domain block BD is extracted from restored image RF based on the position information of domain block BD contained in the initial code data DC. The extracted domain block BD is subjected to reduction conversion using the reduction ratio α contained in the code data DC to obtain compressed image BDF. The compressed image BDF is converted using rotation conversion using rotation angle θ in accordance with density inversion conversion Z to obtain range restored image RFR. The range restored image RFR is used to refresh the restored image RF by the range blocks BR.

All range blocks BR, i.e., all code data DC, of restored image RF are refreshed once by a single cycle of the aforesaid process. The aforesaid process is repeated to obtain a restored image RF near the original image GF. Thus, the repetitive conversion encoding method is used to accomplish image compression and restoration.

The construction and operation of the image compression device 1 of the present invention are described hereinafter.

Figure 19:
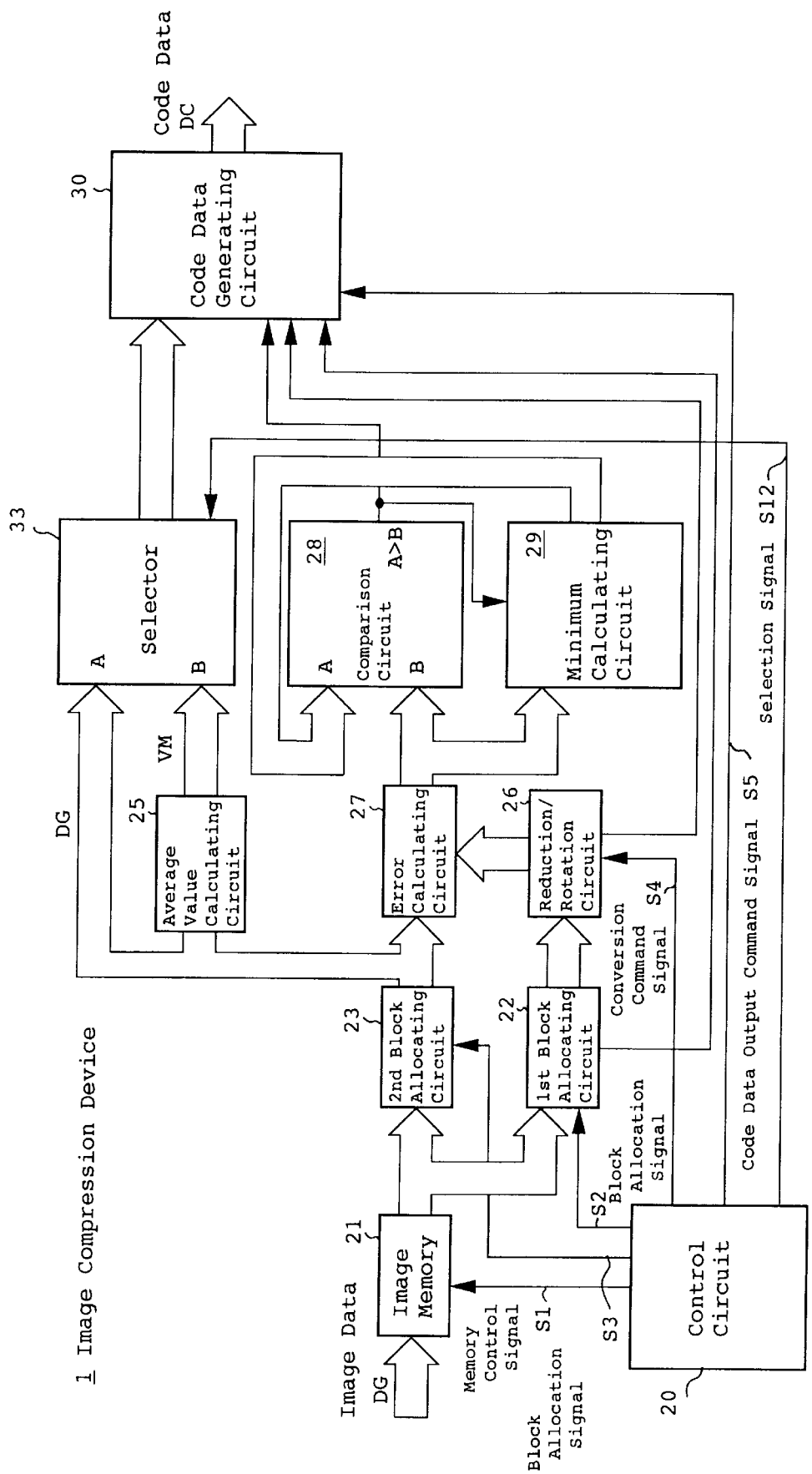
FIG. 19 is a block diagram of the image compression device in accordance with a third aspect of the present invention.

FIG. 19 is a block diagram of the image compression device 1 according to a third aspect of the present invention.

In FIG. 19, image compression device 1 comprises a control circuit 20 as the control means in the present invention, image memory 21, first block allocating circuit 22 as the domain block allocating means, second block allocating circuit 23 as the range block allocating means, average value calculating circuit 25 as the average value calculating means, reduction/rotation conversion circuit 26, error calculating circuit 27, comparison circuit 28, minimum error calculating circuit 29, and code data generating circuit 30, and selector 33 as the selecting means. In FIG. 11, items identical to those of the embodiment of FIG. 1 are omitted or abbreviated in the following discussion.

Code data generating circuit 30 calculates code data DC based on the raw image data DG or average density value VM output from selector 33, signals output from comparison circuit 28, block position information output from first block allocating circuit 22, and conversion coefficient output from reduction/rotation conversion circuit 26. The code data DC is generated for each range block BR, and output in the sequence of generation. Thus, information relating to the position of range block BR is obtained by the sequence of code data DC of a target range block BR in all code data DC. Whether or not the range block BR is a special range block BRS is discriminated by the value of reduction ratio α, or whether or not either raw image data DG or average density value VM is the code data. The code data DC output from the code data generating circuit 30 are image compression data of original image GF.

Control circuit 20 outputs memory control signal S1 to image memory 21 to control the reading and writing of image memory 21, outputs block allocation signals S2 and S3 to first block allocating circuit 22 and second block allocating circuit 23 to control reading operations, outputs a conversion command signal S4 to conversion/rotation conversion circuit 26 to control the conversion operation, outputs code data output command signal S5 to code data generating circuit 30 to control code data DC generation and output, and outputs selection signal S12 to selector 33 to control the selection operation. Furthermore, control circuit 20 provides overall control of the image compression device 1.

Control circuit 20 discriminates whether or not a range block BR is a special range block BRS when code data DC are generated for a single range block BR, and controls selector 33 so as to select average density value VM when the range block BR is not a special range block BRS, and controls selector 33 so as to select raw image data DG when the range block BR is a special range block BRS. When determining whether or not a range block BR is a special range block BRS, the minimum error δA stored in minimum error calculating circuit 29 is compared to a previously set threshold value δt, such that the range block BR is designated a special range block BRS when the minimum error δA is greater than the threshold value δt.

The process operation of image compression device 1 is described below with reference to the flow chart.

Figure 20:
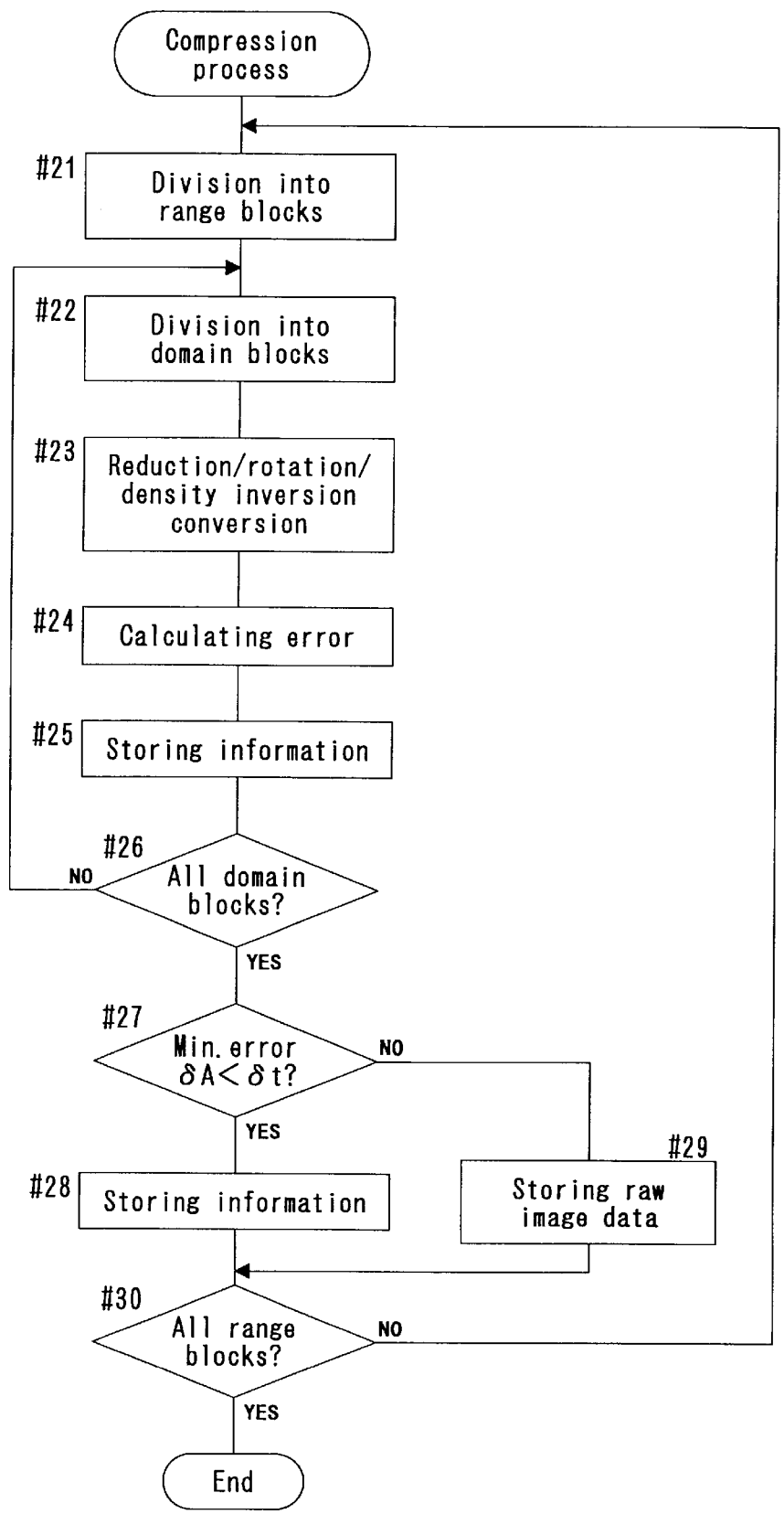
FIG. 20 is a flow chart of the compression process in the image compression device in accordance with the present invention.
Figure 21:
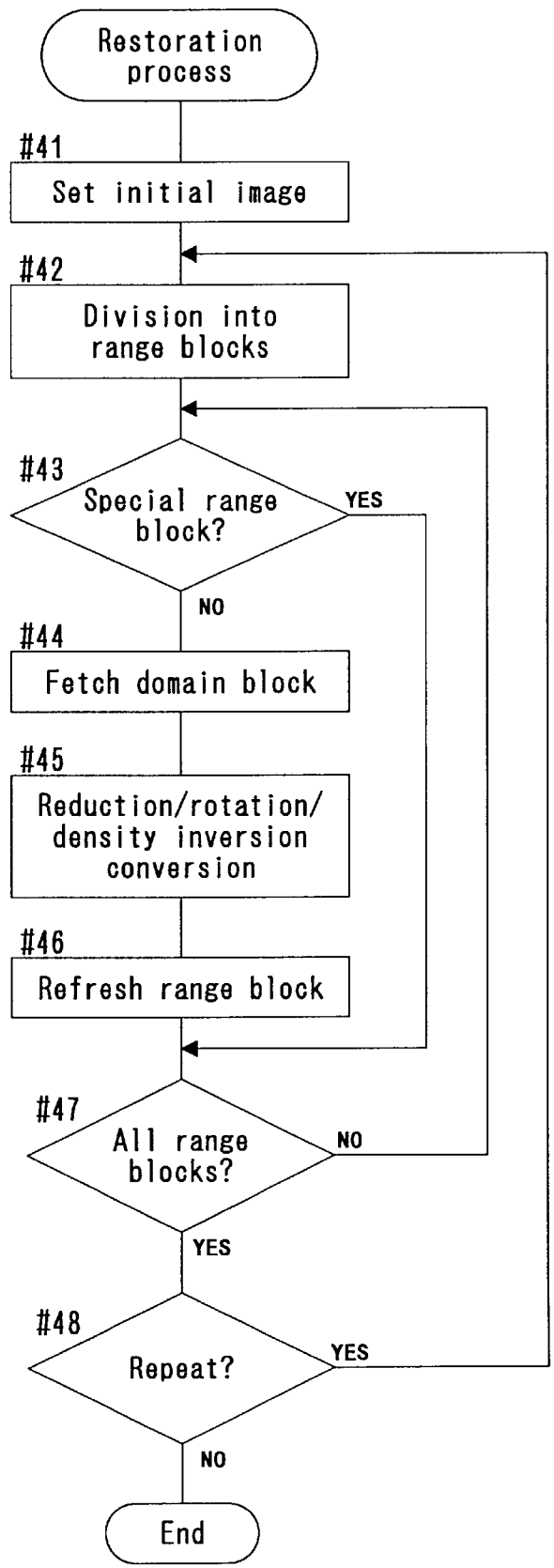
FIG. 21 is a flow chart of the restoration process in accordance with the present invention.

FIG. 20 is a flow chart showing the compression process (encoding process) in image compression device 1, and FIG. 21 is a flow chart showing the restoration process (decoding process). The image compression device 1 of FIG. 3 shows only the portion for executing the compression process, and the portion for executing the restoration process is not shown. Accordingly, the flow chart of FIG. 21 is described below with reference to FIG. 18.

In FIG. 20, an original image GF which is to object of encoding is divided into range blocks BR, and one range block BR is fetched (#21). The original image GF is divided into domain blocks BD, and a single domain block BD is fetched (#22). The fetched domain block BD is subjected to reduction conversion, rotation conversion, and density inversion to obtain eight reduced patterns BDP1~8 (#23). The error δ of the range block BR and reduced patterns BDP1~8 is calculated (#24), and the reduced pattern BDP1~8 with the smallest error δ is selected, and the conversion parameters and position information of the domain block BD are stored (#25). The previously described processes are performed on all domain blocks BD (#26), and one of the domain block BD, i.e., the conversion parameters and position information of the domain block BD with the minimum error δ, is selected and stored (#25).

The stored error δ, i.e., the minimum error value δA, is compared to the threshold value threshold value δt (#27). When the minimum error value δA is less than the threshold value δt (#27: YES), the position information of the domain block BD with the minimum error δ, the conversion parameters of reduced patterns BDP, and average density value VM of range block BR are selected and stored (#28). When the error δA is greater than a threshold value δt (#27: NO), the raw image data DG of range block BR are selected and stored (#29). All range blocks BR are subjected to the encoding process described above (#30).

In FIG. 21, an initial image the same size of the original image GF is set as the restored image RF (#41). At this time, when the average density value VM of the range block BR is present in the code data DC, the average density value VM is set as the initial value of the range block BR, whereas when the raw code data DG of range block BR are resent in the code data DC, the raw code data DG is set as the initial value of the range block BR.

The restored image RF is divided into a plurality of range blocks BR (#42). Then, a determination is made as to whether or not the range block BR is a special range block BRS (#43). When the range block BR is not a special range block BRS (#43: NO), the image data for the position of the domain block BD corresponding to the range block BR are fetched (#44), and conversion processing is executed based on the reduction ratio α, rotation angle θ, and density inversion Z contained in the code data DC (#45). The range restored image RFR obtained by the aforesaid process is substituted for the range block BR to refresh the range block BR (#46)

When the range block BR is a special range block BRS (#43: YES), steps #44~46 are skipped.

The aforesaid precess is performed for all range blocks BR (#47). Thus, a restored image RF is obtained which is nearer to the original image GF than the initial image. The aforesaid process is repeated for a set number of times (#48). The number of repetitions may be set, for example, at 10~20 repetitions. A restored image RF which is nearer to the original image GF is obtained by the above process.

According to the previously described embodiment, during expansion, a determination is made as to whether or not a range block BR is a special range block BRS, and when the range block is a special range block BRS, the processes of steps #44~46 are skipped, thereby reducing the time required for processing. When the range block BR is a special range block BRS, the initial value of the restored image RF of the special range block BRS is equal to the image data DG of the original image GF, such that the part of the restored image is initially complete, and when a domain block BD is selected which contains the special range block BRS as a most similar block, the restoration of the restored image RF is accomplished with few restoration repetitions and a restored image RF is obtained which is highly faithful to the original image GF. That is, when an image is compressed and code data generated by the aforesaid image compression device 1, the restoration of the image can be accomplished with fewer repetitions of the restoration process, thereby reducing the time necessary for the restoration process.

Either the selection of the most similar block, or the comparison of minimum error δA and threshold value δt may be executed first. For example, after the most similar block is selected, a check may be made to determine whether or not the error δ is less than the threshold value δt, or a check may be made to determine whether or not the error δ is less than the threshold value δt each time error δ is calculated, or various other methods may be used.

In the previously described image compression device 1, an original image GF is divided into a plurality of inspection areas which are ranked beforehand, and the domain blocks BD corresponding to each range block BR may be searched from the highest ranked inspection area ER. In this case, when the minimum error δA of range block BR and reduced pattern BDP of domain block BD selected from one or a predetermined number of inspection areas ER is less than a threshold value δt, code data DC are generated by selecting the domain block BD, reduced pattern BDP, and average density value VM, whereas when the minimum error δA is greater than a threshold value Vt, the code data are generated by the raw image data DG. Thus, the time required for searching the domain blocks BD is reduced, thereby reducing the time necessary for image compression. Furthermore, an original image PM may be allocated in accordance with predetermined area attributes, and the method of the present invention may be applied within the attribute areas.

This aspect of the present invention reduced the time required for the image restoration process by reducing the number of repetitions of the restoration process when restoring an image.

This aspect of the present invention also reduces the time required for image compression by eliminating or greatly simplifying the process for generating code data for a range block by determining beforehand that a range block satisfies constant conditions in an object original image.

Furthermore, when there are no most similar blocks having weak similarity, the range block is determined to satisfy constant conditions and raw image data are used to generate code data, thereby achieving greater accuracy in the restored image.

Fourth Aspect of the Present Invention

The fractal image compression principle of the present invention is described hereinafter.

Figure 23:
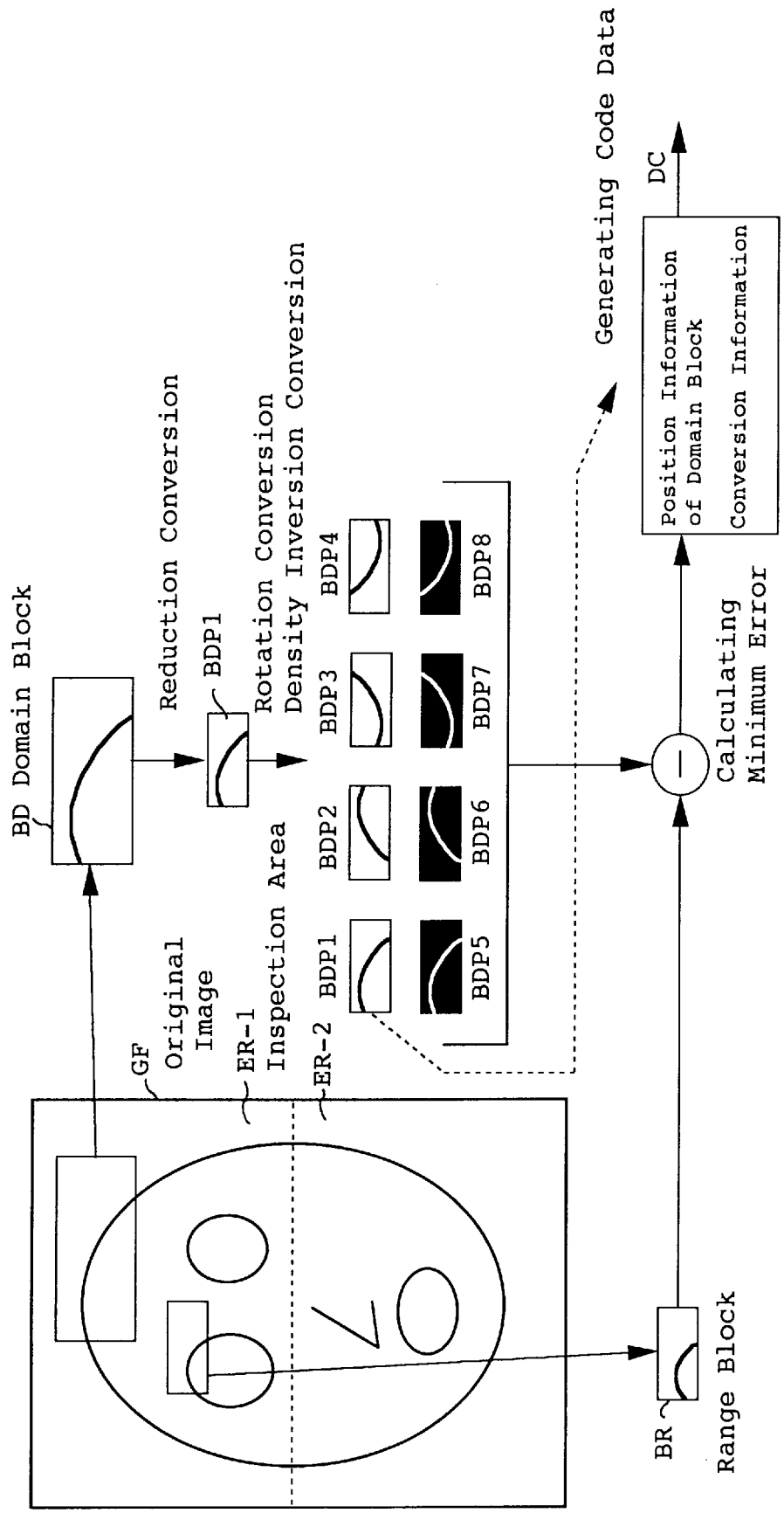
FIG. 23 shows the fractal image compression in accordance with a fourth aspect of the present invention.
Figure 25:
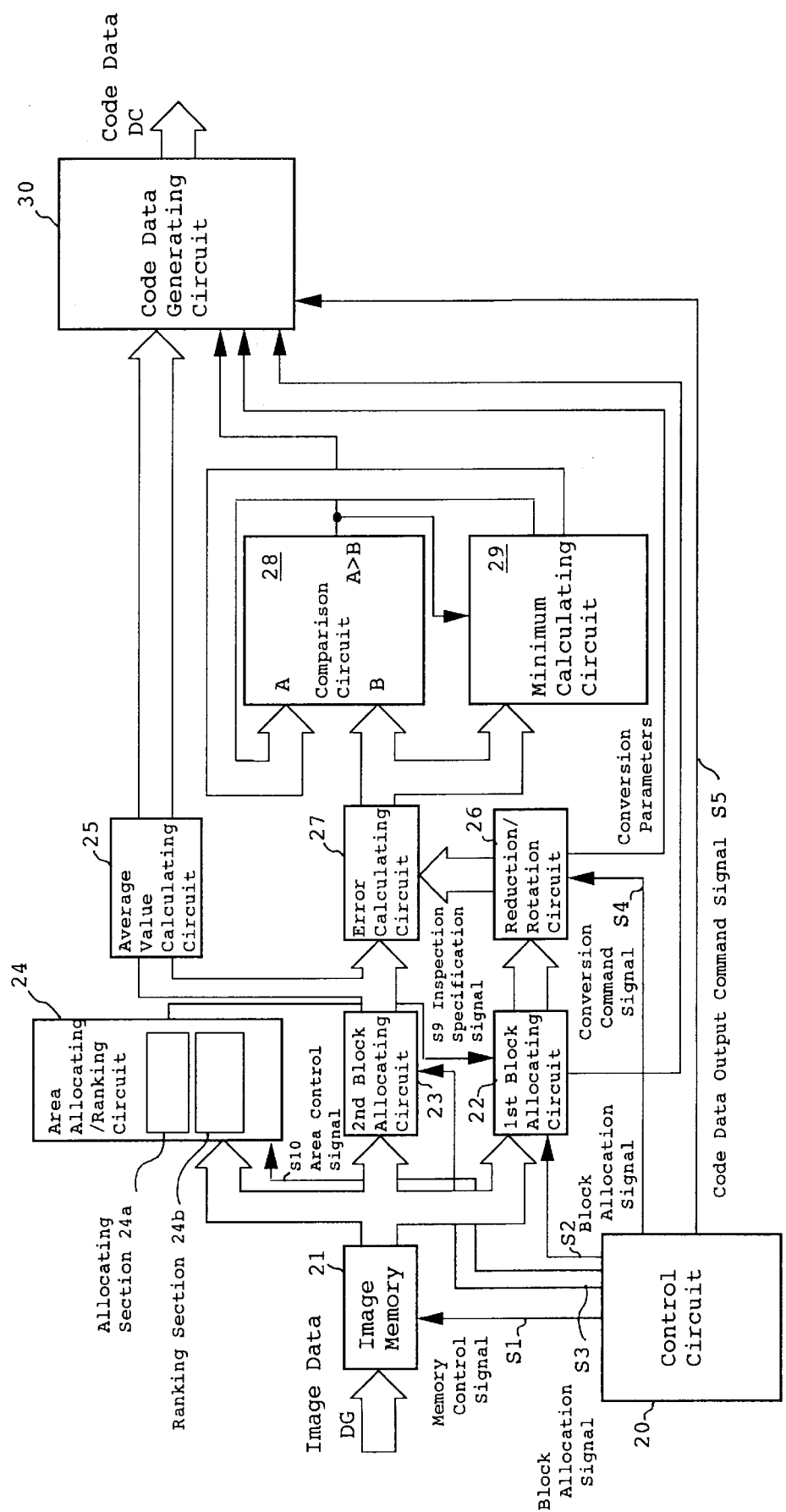
FIG. 25 is a block diagram of the image compression device in accordance with a fourth aspect of the present invention.
Figure 29:
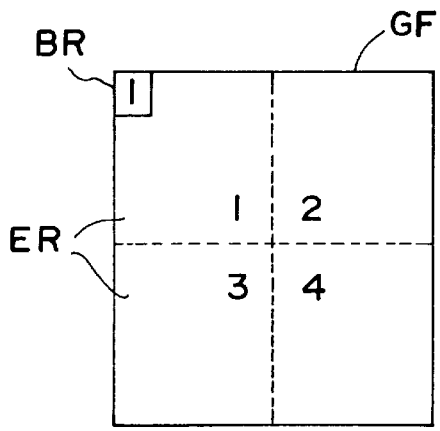
FIGS. 29(1)–29(5) are illustrations describing the ranking of the inspection areas in accordance with the present invention.
Figure 29:
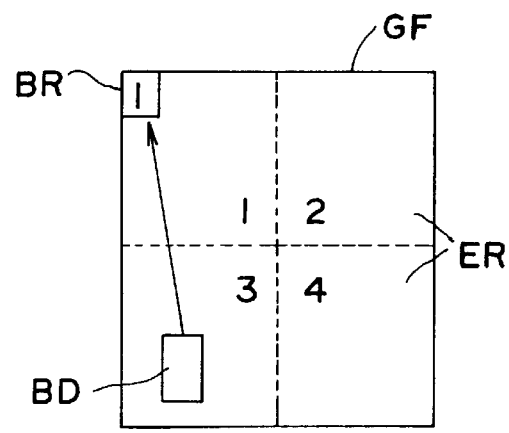
Figure 29:
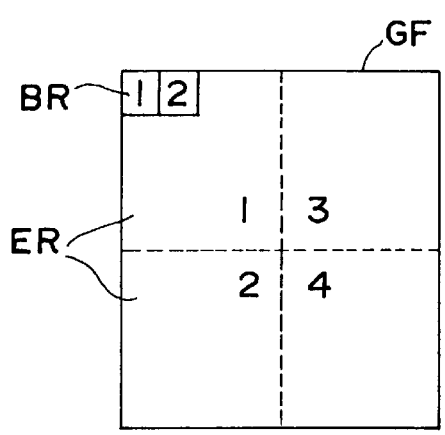
Figure 29:
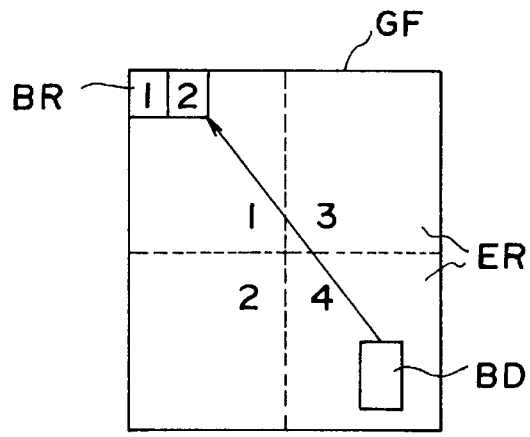
Figure 29:
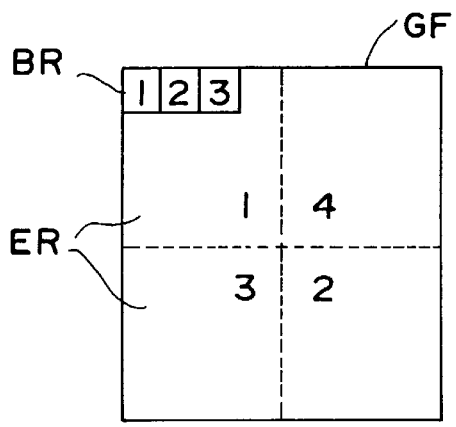
Figure 30:
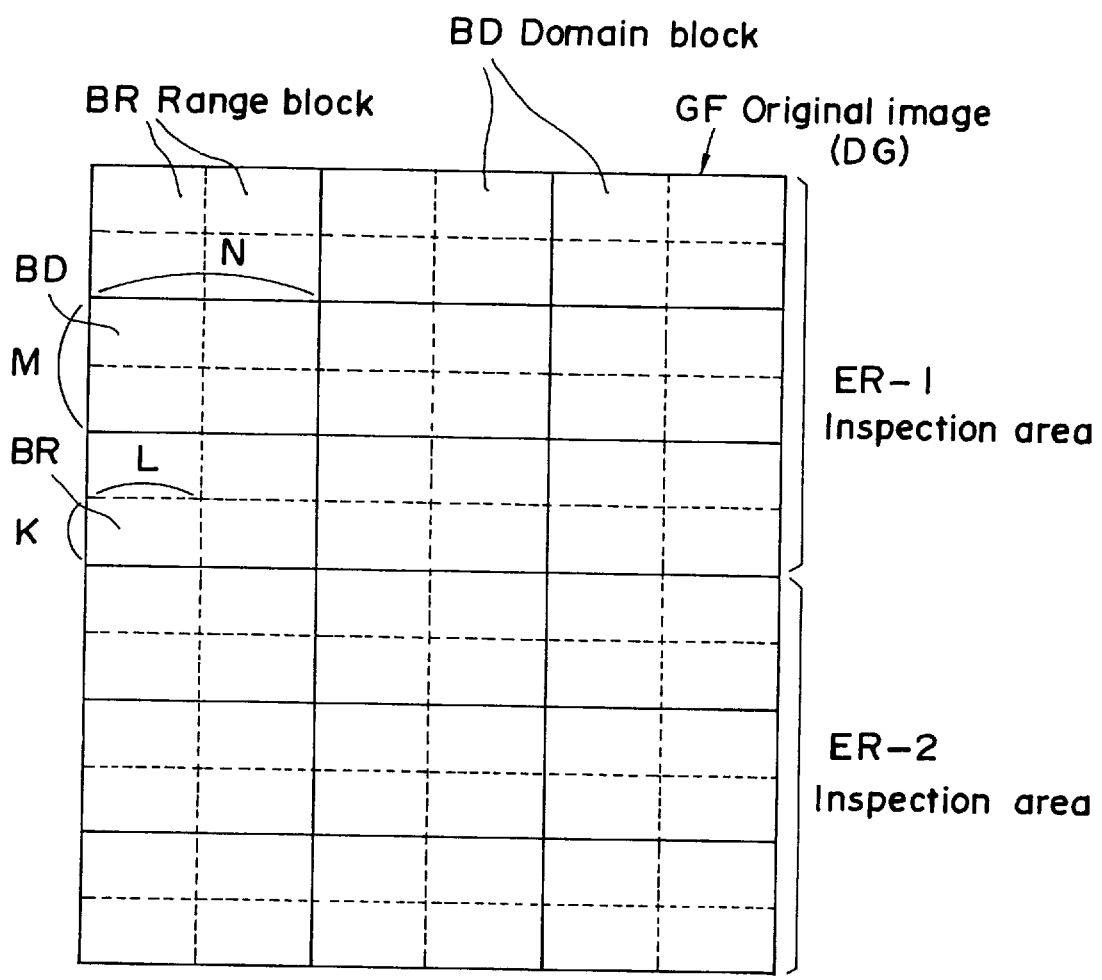
FIG. 30 shows the relationship among the inspection area, domain block and the range block in an original image.

FIG. 23 shows a fractal image compression device according to a fourth aspect of the present invention. FIG. 25 shows a fractal image restoration device for restoring compressed fractal image data. FIG. 29 illustrates rankings of inspection area ER; FIG. 30) is an illustration showing the relationship among range blocks BR, domain blocks BD, and inspection areas ER in original image GF. In FIG. 23, items identical to those of the conventional technology described in FIG. 32 are omitted or abbreviated in the following discussion.

In FIG. 23, original image GF is divided into a plurality of range blocks BR (block size: K×L) as in other embodiments. Minimum error is calculated for each allocated range block BR. The calculation of minimum error is accomplished by allocating domain blocks BD as error reference objects from among the first-ranked inspection area ER, and reading image data of the allocated domain block BD.

During image compression, first the entire original image GF is divided into a plurality of inspection areas ER, and each of the allocated inspection areas ER is ranked. Each inspection area ER is larger in size than the domain block BD, and the aspect size is, as far as possible, an integer multiple of the domain block BD. The assignment of rank to each inspection area allows the possibility of changing the ranking each time code data DC is generated for a single range block.

Figure 24:
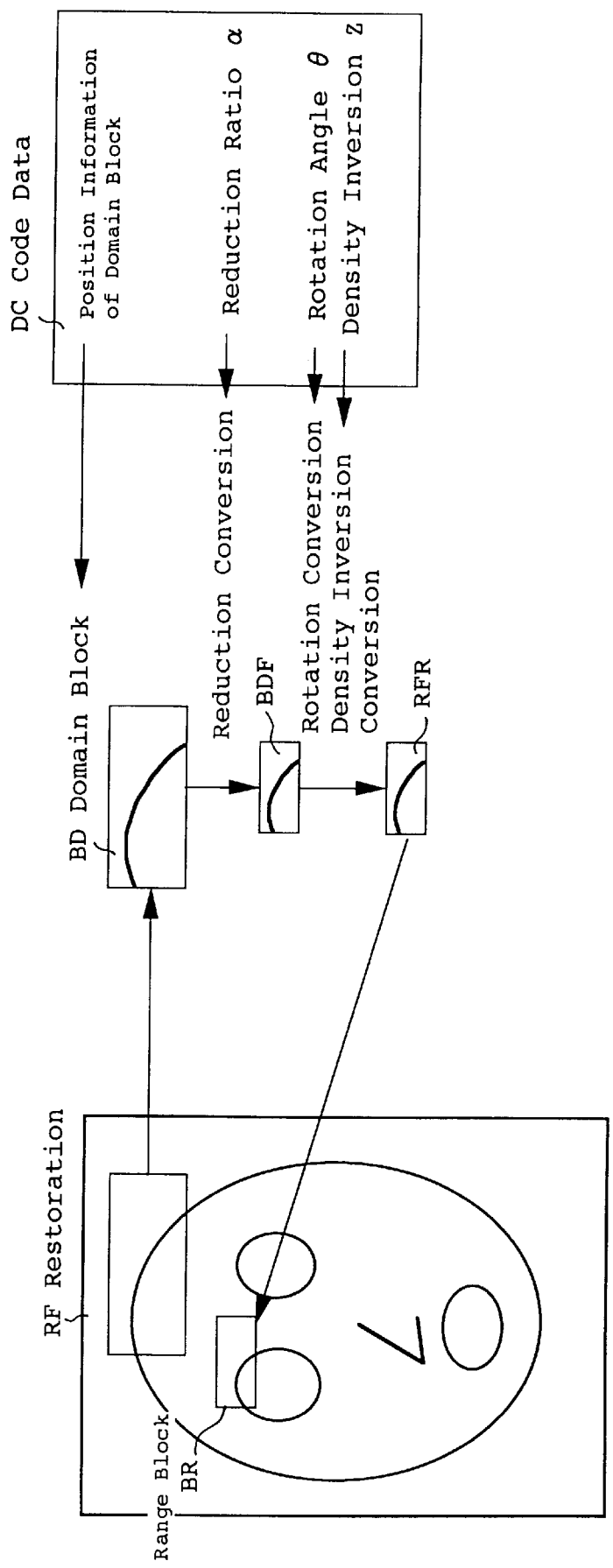
FIG. 24 shows the image restoration of a compressed fractal image in accordance with a fourth aspect of the present invention.
Figure 31:
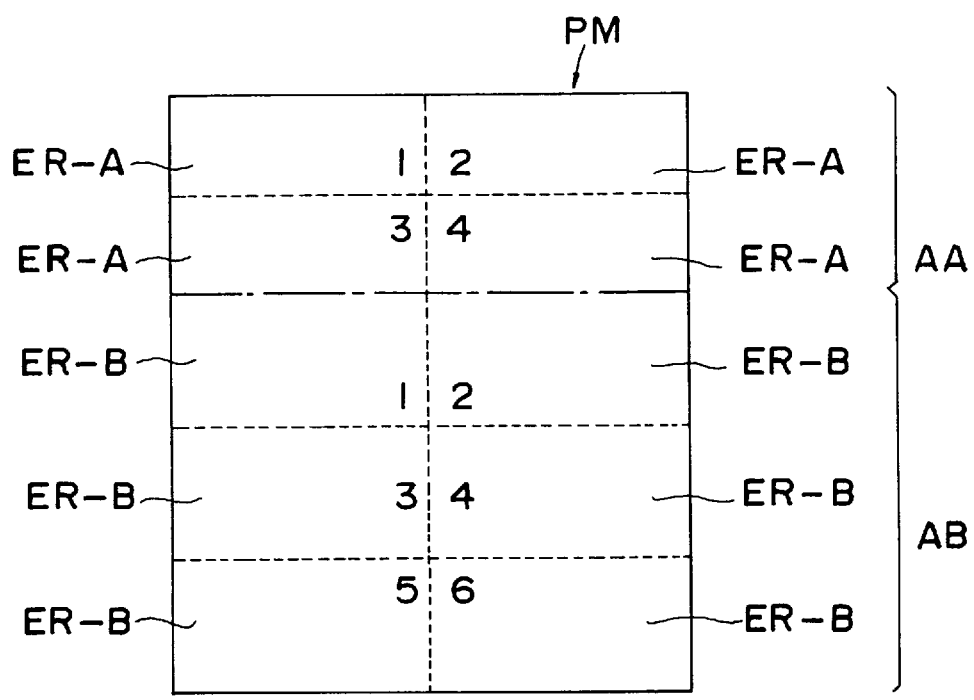
FIG. 31 shows the inspection area when an original image is allocated by attribute areas.

The ranking of inspection areas ER is determined in the manner described below. Initially, an inspection area containing a range block BR is assigned the first rank to generate code data DC. Then, the second, third and subsequent ranks are assigned in sequence from the inspection area most similar to the first inspection area ER. In the examples of FIGS. 24 and 31, an original image GF is divided into two top and bottom inspection areas ER. Initially, because range blocks BR are allocated from the top inspection area ER and code data are generated therefrom, the top inspection area ER-1 is ranked first, and the bottom inspection area ER-2 is ranked second.

After the first code data are generated, the inspection area ER containing the range block BR used to generate the code data DC does not have its first rank changed, but the inspection area ER selected as being most similar (the domain block BD having the smallest error) during the generation of the previous, i.e., first, code data DC is assigned the second rank. Then, the third and fourth ranks are assigned in sequence from the inspection area ER most similar to the first rank inspection area ER. In the example of FIG. 1, when the most similar block is selected from the inspection area ER-1 in the first selection, the top inspection area ER-1 is assigned the first rank, and the bottom inspection area ER-2 is assigned the second rank.

The rankings of inspection areas ER are described in detail below with reference to FIG. 29.

In FIGS. 29(1)–29(5), original image GF is divided into four inspection areas ER. Range block BR is allocated from the top left edge of original image GF in a rightward direction. In ranking the inspection areas ER, first, as shown in the numbered sequence of FIG. 29(1), the inspection area ER containing the range block BR used to generate the code data DC is assigned the first rank, the inspection area ER on the right side is assigned the second rank, the bottom left inspection area ER is assigned the third rank, and the bottom right inspection area ER is assigned the fourth rank. Ranked in this manner, the domain block BD is allocated in the first rank inspection area ER, and the allocated domain block BD is subjected to reduction conversion, rotation conversion, and density inversion to generate reduced patterns BDP1~8, and the error is calculated by comparing the range block BR to each reduced pattern BDP1~8.

In the domain block BD in the first rank inspection area ER, when the domain block BD with the smallest error and its reduced patterns BDP are selected and the error is less than a threshold value, this domain block BD is selected as the most similar block. When there is no domain block BD with an error less than a threshold value in the first-ranked inspection area ER, a check is made for a most similar block in the second-ranked inspection area ER, and if the error is not less than a threshold value, the third-ranked and fourth-ranked inspection areas ER are sequentially checked for a most similar block. As shown in FIG. 29(2), when a most similar block is selected from the third-ranked inspection area ER, the rank of the inspection area ER is promoted in the next cycle such that the third-ranked inspection area ER is promoted to the second rank shown in FIG. 29(3), and the second-ranked inspection area ER is demoted to the third rank. The first-ranked inspection area ER does not change rank because the second range block BR is allocated from the same inspection area ER.

As shown in FIG. 29(4), when the second range block BR is selected as the most similar block from the fourth inspection area ER, the ranking of the inspection areas ER is such that the fourth-ranked inspection area ER is promoted to the second rank, and the second-ranked and third-ranked inspection areas ER are respectively demoted one by one. The first-ranked inspection area ER does not change rank because the third range block BR is allocated from the same inspection area ER.

As described above, the domain blocks BD are sequentially checked in the high-ranked inspection area ER relative to range block BR in accordance with the rank of the inspection area ER, and when the error between a range block BR and reduced pattern BDP of a domain block BD selected from a single inspection area ER is less than a threshold value, that domain block BD is selected. When the error is not less than a threshold value for the domain blocks BD in all inspection areas ER, the domain block BD with the smallest error is selected as the most similar block.

The average density value VM is calculated for the range block BR, and code data DC are generated based on the calculated average value VM, discrimination information of minimum error density pattern BAD and position information of domain block BD, and the conversion information (conversion parameters) of reduced patterns BDP1~8, i.e., reduction ratio (reduction conversion coefficient) (x, rotation angle (rotation conversion coefficient) θ, and density conversion Z.

Range block BR is often a normal square, e.g., 8×8 pixels, 4×4 pixels or the like. Domain block BD often has a shape similar to range block BR, albeit larger in size.

In FIG. 24, restored image RF is a restored (expanded) image approaching the original image GF in accordance with repeated restoration processing, and an initial image is created at the start of the restoration process. An initial image is set, for example, by the average density value VM of each range block BR contained in code data DC. In the restoration process, the domain block BD is extracted from the restored image RF based on the position information of the domain block BD contained in the initial code is data DC. The extracted domain block BD is subjected to reduction conversion using the reduction ratio α contained in the code data DC to obtain reduced image BDF. The reduced image BDF is converted using rotation conversion using rotation angle θ in accordance with density inversion conversion Z to obtain range restored image RFR. The range restored image RFR is used to refresh the restored image RF by the range blocks BR. All range blocks BR, i.e., all code data DC, of restored image RF are refreshed once by a single cycle of the aforesaid process. The aforesaid process is repeated to obtain a restored image RF near the original image GF. Thus, the repetitive conversion encoding method is used to accomplish image compression and restoration.

The construction and operation of the image compression device 1 of the present invention are described hereinafter.

FIG. 25 is a block diagram of the image compression device 1 of the present invention.

In FIG. 25, image compression device 1 comprises a control circuit 20, image memory 21, first block allocating circuit 22, second block allocating circuit 23, area ranking circuit 24, average value calculating circuit 25, reduction/rotation conversion circuit 26, error calculating circuit 27, comparison circuit 28, minimum error calculating circuit 29, and code data generating circuit 30. In FIG. 11, items identical to those of the embodiment of FIG. 1 are omitted or abbreviated in the following discussion.

The area allocating/ranking circuit 24 is provided with an allocating portion 24a and a ranking portion 24b. Allocating portion 24a allocates the original image GF into a plurality of inspection areas ER. In the allocation process, for example, the top or bottom address of the image memory 21 is determined for each inspection area ER, or the coordinate positions of the starting point and end point is determined for each inspection area ER, or the parameters are determined for determining the aforesaid addresses or coordinates positions. In addition to such determinations, a discrimination code is applied to each inspection area ER.

Ranking portion 24b ranks the inspection areas ER. The ranking process outputs an inspection specification signal S9 to the first block allocating circuit 22 to specify the inspection area ER of domain block BD which will be read next by the first allocating circuit 22.

Control circuit 20 outputs memory control signal S1 to image memory 21 to control the reading and writing of image memory 21, outputs block allocation signals S2 and S3 to first block allocating circuit 22 and second block allocating circuit 23 to control conversion operations, as in other embodiments, control circuit 20 also outputs an area control signal S10 to area allocating/ranking circuit 24 to control the operation of area allocating/ranking circuit 24, outputs a conversion command signal S4 to conversion/rotation conversion circuit 26 to control the conversion operation, and outputs code data output command signal S5 to code data generating circuit 30 to control code data DC generation and output Control circuit 20 sequentially selects the inspection area ER from the highest ranked area ER, and controls the generation of code data DC of domain block BD with the smallest error δ from among all domain blocks BD allocated in an inspection area ER when the error δ of reduced pattern BDP of the domain block BD allocated in the selected inspection area ER is less than a threshold δt. When the error δ of reduced pattern BDP in an inspection area ER is not less than a threshold value δt, the domain block BD with the smallest error δ is selected, and code data DC is generated for the domain block BD.

The operation of image compression device 1 is described below with reference to the flow chart.

Figure 27:
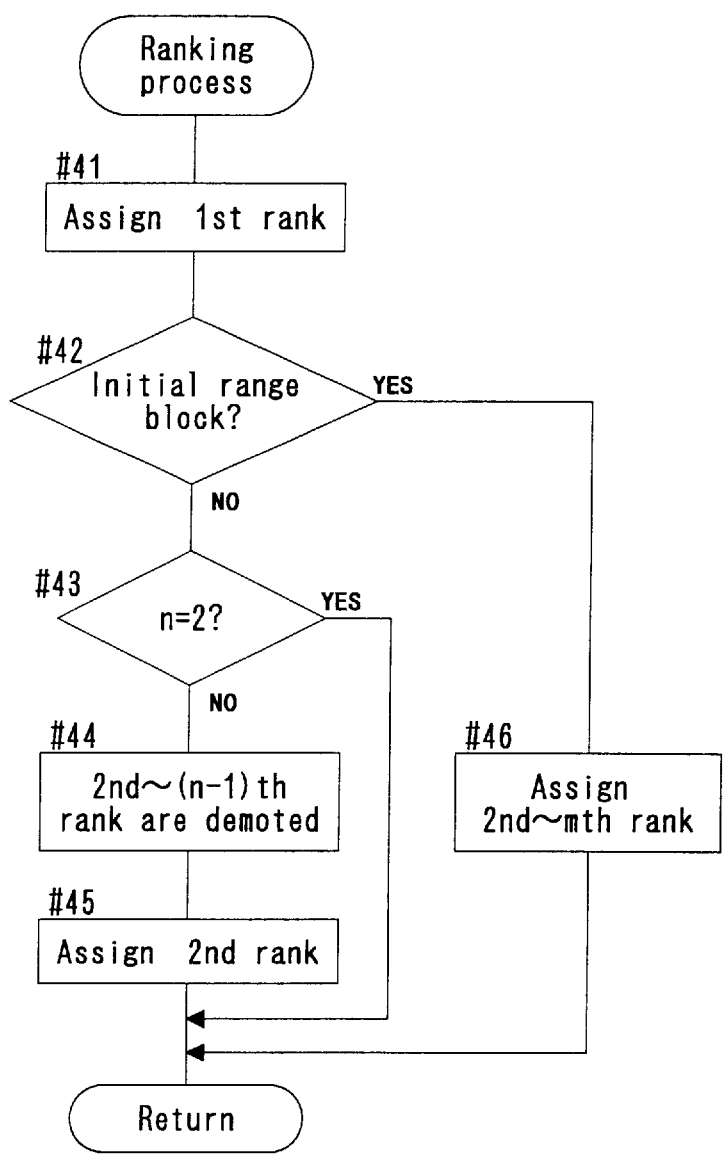
FIG. 27 is a flow chart of the ranking process in accordance with the present invention.
Figure 28:
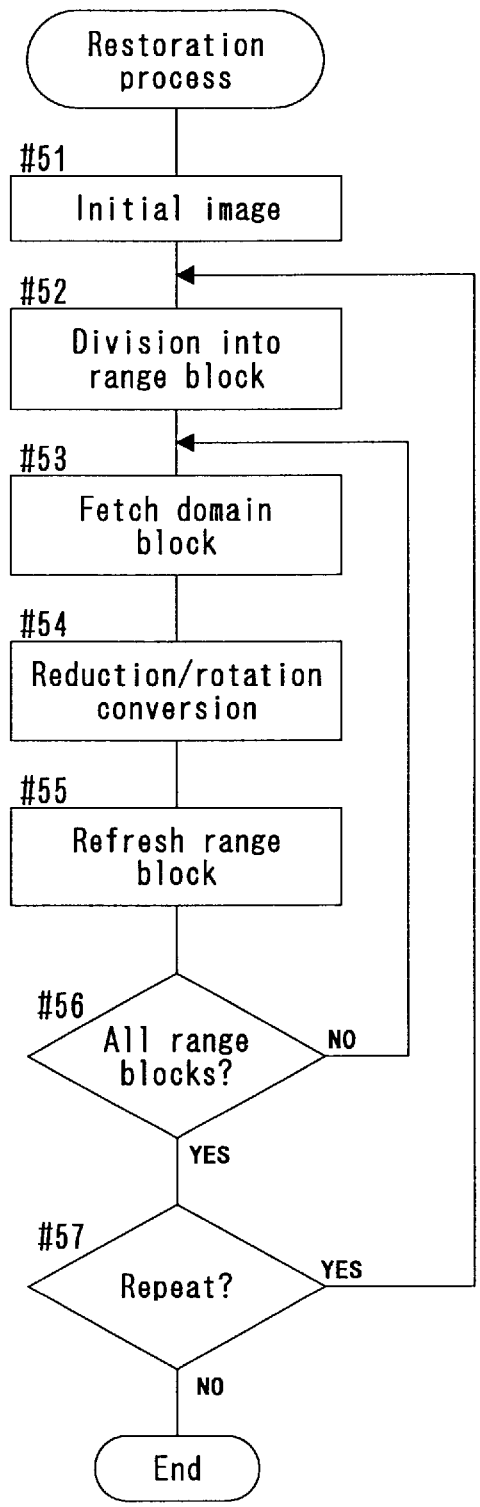
FIG. 28 is a flow chart of the restoration process in accordance with the present invention.

FIG. 27 is a flow chart showing the compression process (encoding process) in image compression device 1; FIG. 27 is a flow chart showing the ranking process; FIG. 28 is a flow chart showing the restoration process (decoding process). The image compression device 1 of FIG. 25 shows only the portion for executing the compression process, and the portion for executing the restoration process is not shown. Accordingly, the flow chart of FIG. 28 is described below with reference to FIG. 24.

Figure 26:
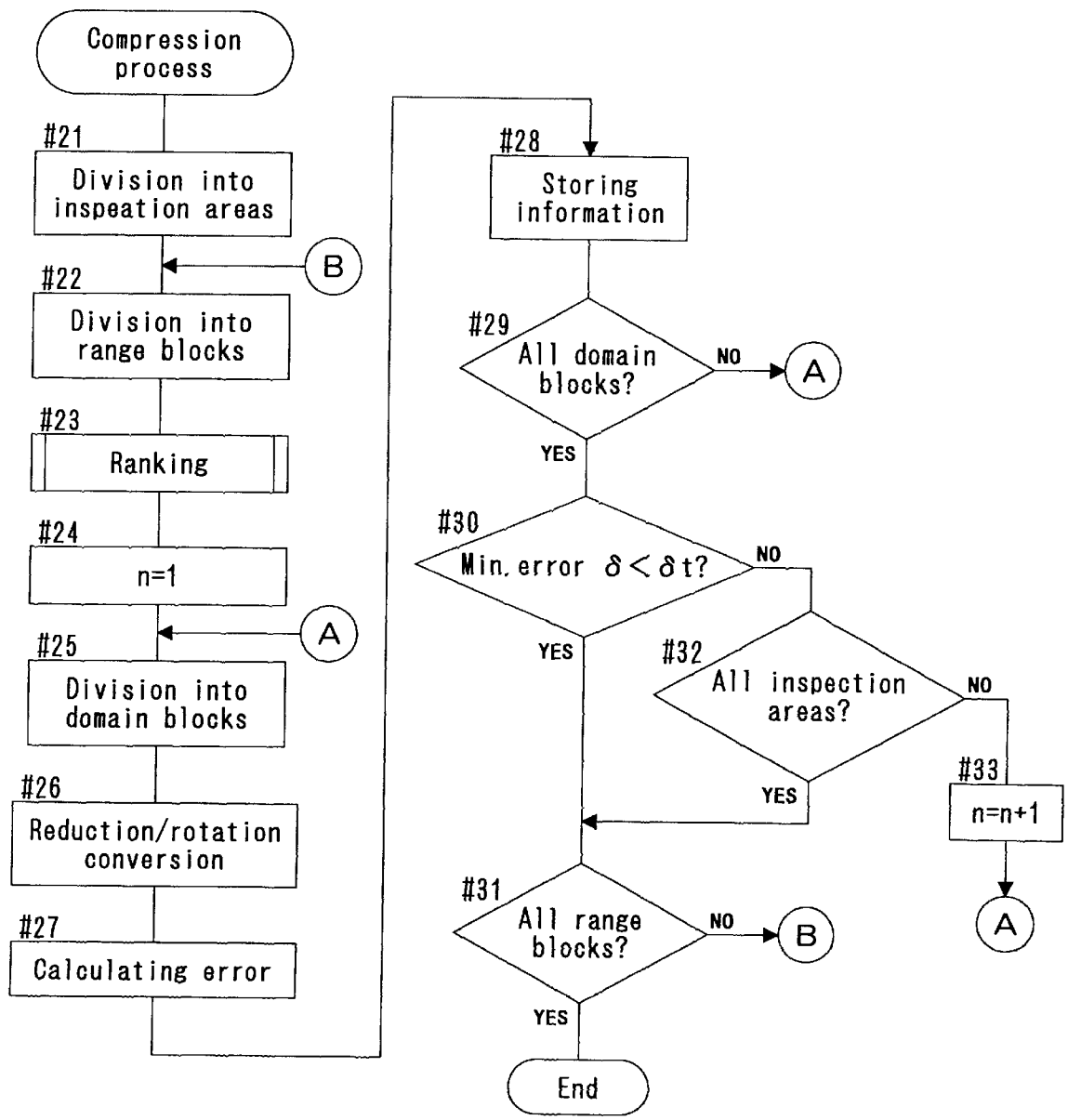
FIG. 26 is a flow chart of the compression process in the image compression device in accordance with the present invention.

In FIG. 26, an original image GF which is to object of encoding is divided into a plurality of inspection area ER (#21). Then, the original image GF is divided into range blocks BR, and one allocated range block BR is fetched (#22). The inspection areas ER are ranked from the first rank to the $m^{th}$ rank so that the inspection area ER containing the fetched range block BR assigned the first rank (#23). This sets the variable n at [1] (#24).

The $n^{th}$-ranked inspection area ER is allocated into a plurality of domain blocks BD, and a single allocated domain block BD is fetched (#25). The fetched domain block BD is subjected to reduction conversion, rotation conversion, and density inversion to obtain eight reduced patterns BDP1~8 (#26). The error δ of the range block BR and reduced patterns BDP1~8 is calculated (#27), and the reduced pattern BDP with the smallest error δ is selected, and the conversion parameters and position information of the domain block BD are stored (#28). The aforesaid processes are performed on all domain blocks BD of the $n^{th}$-ranked inspection area ER, and the reduced pattern BDP and domain block BD with the minimum error δ is selected (#29).

The error δ (minimum error) of the selected reduced pattern BDP is compared to a threshold value δt (#30). When the error δ of the selected reduced pattern BDP is greater than a threshold value δt (#30: NO), the variable n is incremented [1] to select the reduced pattern BDP with the minimum error from the next-ranked inspection area ER (#33). When the aforesaid process has been performed for all inspection areas ER and none have an error δ less than a threshold value δt, the reduced pattern BDP with the smallest error is selected. Thus, one position information of domain block BD and one conversion parameter of reduced pattern BDP are selected from the entire original image GF, and the selected information is stored as the code data DC of range block BR (#27). The aforesaid encoding process is performed on all range blocks BR (#31).

In FIG. 27, the inspection area ER containing the range block BR is assigned the first rank (#41). When the initial range block BR is selected (#42: YES), the second rank: to the $m^{th}$ rank are assigned in sequence from the inspection area ER nearest the initial range block BR (#46).

In the case of the second and subsequent range blocks BR (#42:NO), when the variable is not [2], i.e., when the object inspection area ER is not the second-ranked inspection area ER (#43: NO), the rank of the second-ranked to (n−1)-ranked inspection areas ER are demoted [1] (#44), and the $n^{th}$-ranked inspection area ER, i.e., the rank of the object inspection area ER, is assigned the second rank (#45).

In FIG. 28, an initial image the same size of the original image GF is set as the restored image RF (#51), and the restored image RF is divided into a plurality of range blocks BR (#52). Then, the image data of the position of the domain block BD is fetched (#53) based on the information contained in code data DC corresponding to range block BR, and conversion processing is executed based on the reduction ratio α, rotation angle θ, and density inversion Z contained in the code data DC (#54).

The range restored image RFR obtained by the aforesaid process is substituted for the range block BR to refresh the range block BR (#55). The aforesaid precess is performed for all range blocks BR (#56). Thus, a restored image RF is obtained which is nearer to the original image GF than the initial image. The aforesaid process is repeated for a set number of times (#57). The number of repetitions may be set, for example, at 10–20 repetitions. A restored image RF which is nearer to the original image GF is obtained by the above process.

According to the previously described compression device 1, during compression the original image GF is divided into a plurality of inspection areas ER, the allocated inspection areas ER are ranked, and domain blocks BD are selected from the selected inspection areas ER according to the ranking, such that the domain block BD with the smallest error, i.e., the domain block BD is checked from the area having the highest probability of having the most similar block, and the time required to check for the most similar block is greatly reduced. In particular, the inspection area ER containing range block BR is normally assigned the first rank, and the inspection area ER containing the most similar block of the previous cycle is assigned the second rank, such that there is no need for wasted time in the search for the most similar block, and the inspection is accomplished at high speed. Thus, the time required for the compression process is greatly reduced.

Either the selection of the most similar block in an inspection area ER, or the comparison of error δ and threshold δt may be executed first. For example, after the most similar block is selected, a check may be made to determine whether or not the error δ is less than the threshold value δt, or a check may be made to determine whether or not the error δ is less than the threshold value δt each time error δ is calculated, or various other methods may be used.

In the previously described image compression device 1, all inspection areas BR allocated from an original image GF are ranked from a first rank, but the original image GF may be divided beforehand in accordance with area attributes, so as to rank the allocated inspection areas by the attributes in the respective inspection areas. This method is described with reference to FIG. 31.

FIG. 31 shows inspection areas ER when an original image GF is allocated by attributes. In FIG. 31, the top portion of original image GF is text areas AA, and the bottom portion is a photographic area AB. The text area AA is allocated into four inspection areas ER-A, and the photographic area AB is allocated into six inspection areas ER-B. The inspection areas ER-A and ER-B are ranked first rank through fourth rank in the text area AA and first rank through sixth rank in the photographic area AB. In the selection of domain block BD, when a range block BR is in text area AA, the domain block BD is selected in inspection area ER-A as the most similar block, whereas when the range block BR is in the photographic area Ab, the domain block BD is selected in inspection block ER-B as the most similar block.

Thus, the inspection of domain blocks BD is accelerated, and the time required for image compression is greatly reduced by ranking the inspection areas ER independently by attributes, i.e., by application of the present invention to areas allocated by attribute. In this case, the areas allocated by attribute comprise the original image GF.

In the embodiment described above, when range block BR is a text area, it may be reallocated as smaller range blocks BR.

Although eight reduced patterns BDP1~8 are generated in the conversion process, 7 or fewer, or 9 or more reduced patterns BDP may be created. In the selection of domain blocks BD from original image GF, previously generated density patterns may be stored beforehand in a suitable memory, and read from the memory to substitute the data of domain block BD. The conversion process may by a mirror inversion process. The sizes of the range block BR and domain block BD may be sizes other than those used in the aforesaid embodiment. Furthermore, the construction of the entire image compression device 1 and image restoration device 2, either in whole or in part, and the content, sequence and timing of processes and the like may be variously modified insofar as the modifications do not depart from the scope of the present invention.

The present invention reduces the time required for compression processing by starting the search from an area having the highest possibility of being the most similar block.

Furthermore, the search for the most similar block is accomplished at high speed because the inspection area containing a range block is assigned the first rant In the embodiment described above, when range block BR is a text area, it may be, reallocated as smaller range blocks BR. Although eight reduced patterns BDP1~8 are generated in the conversion process, 7 or fewer, or 9 or more reduced patterns BDP may be created. In the selection of domain blocks BD from original image PM, previously generated density patterns may be stored beforehand in a suitable memory, and read from the memory to substitute the data of domain block BD. The conversion process may by a mirror inversion process. The sizes of the range block BR and domain block BD may be sizes other than those used in the aforesaid embodiment. Furthermore, the construction of the entire image compression device 1, either in whole or in part, and the content, sequence and timing of processes and the like may be variously modified insofar as the modifications do not depart from the scope of the present invention.

What is claimed is:

1. A fractal image compression device comprising:
   a domain block allocation means for dividing an original image into a plurality of domain blocks;
   a density pattern storing means for storing as domain blocks a plurality of density pattern data created independently for the original image;
   a range block allocation means for dividing said original image into a plurality of range blocks having different size from said domain blocks;
   a pattern generating means for selecting the domain blocks output from the domain block allocating means or the domain blocks read from the density pattern storing means, and converting said selected domain block to a pattern of the same size as said range block allocated by said range block allocation means;
   an error calculation means for calculating error by comparing said range block and said pattern generated by said pattern generating means; and
   a coding means for coding the original image data by generating a code data which contains information relating to a conversion parameter producing the smallest error in said pattern for the range block and information relating to the position of the domain block having the smallest error in pattern.

2. The fractal image compression device as claimed in claim 1, wherein said range block allocation means divides said original image into a plurality of range blocks smaller in size than the domain blocks, and a pattern generating means subjects the domain blocks to affine transformation including reduction conversion.

3. The fractal image compression device as claimed in claim 2, wherein said affine transformation includes rotation conversion and density inversion conversion.

4. The fractal image compression device as claimed in claim 1 wherein said coding means generates the code data relating to a domain block having the smallest error among the domain blocks read out from the density pattern storing means when there is a pattern with an error less than a set threshold value among the domain blocks read out from the density pattern recording means, and generates the code data relating to a domain block having the smallest error from among the domain blocks output from the domain block allocating means when there is no pattern with an error less than a set threshold value among the domain blocks read out from the density pattern recording means.

5. A fractal image compression method comprising:

dividing an original image into a plurality of range blocks;

dividing an original image into a plurality of domain blocks;

comparing a range block to be compressed with domain blocks;

coding original image data by outputting code data containing information relating to a domain block most similar to a range block based on said comparison result when the range block to be compressed is a range block which does not satisfy a predetermined condition, and by outputting raw image data of a range block to be compressed as code data when said range block is a range block satisfying the predetermined condition, wherein the predetermined condition designates a range block as special when an error of the range block is greater than a threshold value.

6. A fractal image compression device comprising:

a domain block allocation means for dividing an original image into a plurality of domain blocks;

a range block allocation means for dividing said original image into a plurality of range blocks having different size from said domain blocks;

a pattern generating means for converting said domain block to a pattern of the same size as said range block;

an error calculation means for calculating error by comparing said range block and said pattern; and a coding means for coding original image data by outputting code data containing information relating to a domain block most similar to a range block based on said comparison result when the range block to be compressed is a range block which does not satisfy a predetermined condition, and by outputting raw image data of a range block as code data when said range block is a range block satisfying the predetermined condition, wherein the predetermined condition designates a range block as special when the error of the range block is greater than a threshold value.

7. The fractal image compression device as claimed in claim 6, wherein said coding means outputs raw image data of a range block as code data when there is no pattern with an error less than a set threshold value among the domain blocks.

8. A fractal image compression device comprising:

a domain block allocation means for dividing an original image into a plurality of domain blocks;

a range block allocation means for dividing said original image into a plurality of range blocks having different size from said domain blocks;

a ranking means for ranking said domain blocks;

a pattern generating means for converting said domain blocks sequentially from the highest ranking domain blocks to patterns of the same size as said range block allocated by said range block;

an error calculation means for calculating error by comparing said range block and said pattern; and a coding means for coding the original image data by generating a code data which contains information relating to a conversion parameter producing the smallest error in said pattern for the range block and information relating to the position of the domain block having the smallest error in pattern.

9. The fractal image compression device as claimed in claim 8, wherein said ranking means includes an inspection area allocating means for allocating an original image into a plurality of inspection areas and ranks said inspection areas.

10. The fractal image compression device as claimed in claim 9 wherein said coding means generates code data relating to a domain block having the smallest error among domain blocks allocated within an inspection area when the pattern of the domain block allocated in a selected inspection area sequentially selected from the highest ranking inspection area is less than a threshold value.

11. The fractal image compression device as claimed in claim 10, wherein said ranking means ranks inspection areas such that an inspection area containing a range block specified for code data generation is ranked first.

* * * * *